United States Patent [19]

Huynh-Ba

[11] Patent Number: 4,617,369

[45] Date of Patent: Oct. 14, 1986

[54] POLYESTER POLYMERS OF 3-HYDROXY-4'-(4-HYDROXYPHENYL)BENZOPHENONE OR 3,4'-DIHYDROXYBENZOPHENONE AND DICARBOXYLIC ACIDS

[75] Inventor: Gia Huynh-Ba, Wilmington, Del.

[73] Assignee: E. I. Du Pont de Nemours and Company, Wilmington, Del.

[21] Appl. No.: 772,619

[22] Filed: Sep. 4, 1985

[51] Int. Cl.[4] .................................................. C08G 8/02
[52] U.S. Cl. ...................... 528/128; 528/176; 528/190; 528/191; 528/194; 528/195
[58] Field of Search ............... 528/176, 190, 191, 194, 528/195, 128

[56] References Cited

U.S. PATENT DOCUMENTS

| | | | |
|---|---|---|---|
| 4,224,433 | 9/1980 | Colundann et al. | 528/128 |
| 4,245,082 | 1/1981 | Irwin | 528/128 |
| 4,269,965 | 5/1981 | Irwin | 528/128 |
| 4,447,592 | 5/1984 | Harris | 528/128 |
| 4,496,712 | 1/1985 | Irwin | 528/191 |
| 4,499,259 | 2/1985 | Irwin | 528/190 |
| 4,536,561 | 8/1985 | Schmidt et al. | 528/191 |

*Primary Examiner*—Lucille M. Phynes

[57] ABSTRACT

Aromatic polyesters derived from at least 10% glycols of the structure

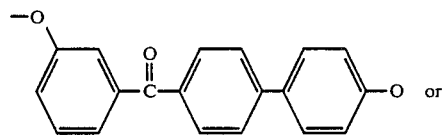

or

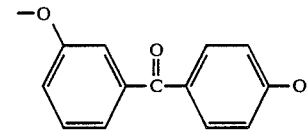

are disclosed. The polyesters have an inherent viscosity of at least 0.5 as measured from a 0.5 g solution in 100 ml of an equal volume mixture of p-chlorophenol and 1,2-dichloroethane, and a heat of fusion of less than 1.5 joule per gram.

108 Claims, No Drawings

POLYESTER POLYMERS OF 3-HYDROXY-4'-(4-HYDROXYPHENYL)BENZOPHENONE OR 3,4'-DIHYDROXYBENZOPHENONE AND DICARBOXYLIC ACIDS

SUMMARY

This invention relates to polyester polymers of 3-hydroxy,4'-(4-hydroxyphenyl)benzophenone or 3,4'-dihydroxybenzophenone and dicarboxylic acids that are processable in molten phase, and may be processed to produce molded articles, fibers and films. Films of these polyesters are biaxially orientable, thus yielding products of substantial strength in two dimensions.

BACKGROUND

Melt fabricable polyesters containing at least 85 mole % of 3-hydroxy,4'-(4-hydroxyphenyl)benzophenone and at least 85 mole % of the diacid of p-phenylene, 2,6-naphthalene, or p,p'-bi-phenylene, are known in the art and are described in Irwin U.S. Pat. No. 4,245,082. Films prepared from the polyester polymers of Irwin cannot be biaxially oriented. U.S. Pat. No. 4,224,433 to Calundann et al. discloses wholly aromatic polyesters in which approximately 15 to 30 mole percent of the units polymerized may be a mixture of isophthalic acid and terephthalic acid.

DETAILED DESCRIPTION

The polyesters of the present invention contain repeating units of polymerized 3-hydroxy,4'-(4-hydroxyphenyl)benzophenone, i.e.,

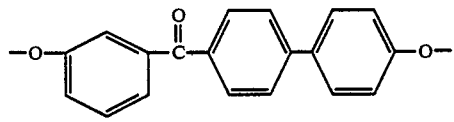

or 3,4'-dihydroxybenzophenone, i.e.,

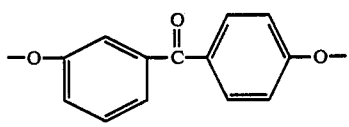

bonded to repeating units of aromatic dicarboxylic acid units, up to 80 mole percent of the aromatic dicarboxylic acid units may be selected from the group consisting of terephthalic acid, 2,6-naphthalene dicarboxylic acid; 1,4-naphthalene dicarboxylic acid, 1,5-naphthalene dicarboxylic acid paradibenzoic acid, 4,4'-(dicarboxy)diphenyl ether, and 2-bis(4-carboxyphenoxy)ethane and from 20 to 100 mole percent of the aromatic dicarboxylic acid units selected from the group consisting of isophthalic acid, 1,3-naphthalene dicarboxylic acid, 2,7-naphthalene dicarboxylic acid, 1,6-naphthalene dicarboxylic acid and 1,7-naphthalene dicarboxylic acid. Optionally the polymer can contain up to 100 mole percent dicarboxylic acid units of a C-6 to C-16 alkylene dicarboxylic acid. Optionally the polymer can contain up to 300 mole percent based on total glycol present of a hydroxy acid selected from the groups consisting of p-hydroxybenzoic acid, 6-hydroxy-2-naphthoic acid, 4-hydroxy-1-naphthoic acid, 5-hydroxy-1-naphthoic acid, 4-hydroxy-2-phenyl benzoic acid and 4-hydroxy-3-phenyl benzoic acid, in which case up to 100 mole percent of the dicarboxylic acid present can be any of those named above. Optionally the polymer can contain up to 80 mole percent based on total glycol present of a glycol selected from the class consisting of hydroquinone, which optionally can be substituted with a methyl, dimethyl, ethyl, methoxy, ethoxy, fluoro, chloro or bromo; phenylhydroquinone; (methylphenyl)hydroquinone; 4,4'-dihydroxybiphenyl; resorcinol; bisphenol A; 2,2-bis(parahydroxyphenyl)hexafluoropropane; di(4-hydroxyphenyl)sulfone; 1,4-naphthalene diol; 1,5-naphthalene diol and 2,6-naphthalene diol.

These polyesters can be injection molded, spun into fibers, and formed into films by extrusion or pressing. The films may be stretched up to five-fold at temperatures above the glass transition temperature.

The polyesters of this invention have glass transition temperatures in the range of about 40° to 180° C., and inherent viscosities in the range of about 0.4 to 4.0 dl/g as defined by the equation.

$$\eta \text{ inh} = \frac{\ln (\eta \text{ rel})}{C}$$

wherein ($\eta$rel) represents the relative viscosity and C represents a concentration of 0.5 gram of the polyester in 100 ml of solvent. The relative viscosity ($\eta$rel) is determined by dividing the flow time in a capillary viscometer of the dilute solution by the flow time for the pure solvent. Flow times are determined at 25° C., and the solvent is a 50/50 volume mixture of p-chlorophenol and 1,2-dichloroethane.

The polymers of the present invention exhibit a heat of fusion ($\Delta H_f$) of less than 1.5 Joules per gram and preferably 0 Joules per gram, measured as described below. By heat of fusion is meant the energy per gram involved in conversion from the solid crystalline state to the liquid crystalline state. Prolonged exposure to temperatures above the Tg of a given polymer of the present invention can cause a crystalline phase to develop which will have a higher $\Delta H_f$.

As used herein thermal characterization of the polymers is done on a Du Pont Thermal Analyzer, Model 1090 equipped with a Du Pont DSC cell. A known weight of resin (usually 5 to 10 mg) is sealed in a DSC pan and maintained under nitrogen throughout the test. The sample is subjected to a heating cycle to remove any crystallinity, thereby eliminating the effects of prior thermal history. This cycle consists of heating to 360° C. at 25° C./min. and holding at 360° C. for two minutes. Crystallization under controlled conditions is effected in a cooldown cycle wherein the sample is cooled from 360° to 40° C. at a rate of 30° C./min. and then maintained at 40° C. for five minutes. Thermal characterization parameters are taken from the second heat-up cycle which consists of heating from 40° C. to 360° C. at 25° C./min. The glass transition temperature (Tg) is defined as the inflection point where the heat flow—temperature curve changes in slope. Crystalline melting shows a characteristic endothermic peak where the melting point (Tm) is taken as the tip of the peak. Heat of fusion ($\Delta H_f$) is determined from the area of the peak relative to a calibration using indium at 156° C. where $\Delta H_f = 28.46$ J/g.

Polymers of the class described herein having low values of ($\Delta H_f$) (i.e., below 1.5 J/g) are stretchable whereas similar polymers derived from 3-hydroxy-4'-(4-hydroxyphenyl)benzophenone or 3,4'-dihydroxybenzophenone with high values of ($\Delta H_f$) are not stretchable.

The polymers of the present invention exhibit optical anisotropy. Optical anisotropy is an indication that the polymer is in the form of liquid crystals which results in the polymer being much more readily melt processable than polymers which are isotropic.

Optical anisotropy of the copolyester melts can be determined by modification of known procedures. It is well known that optically anisotropic materials cause polarized light to be rotated, whereas rotation of polarized light is zero for isotropic materials. Thus, optical anisotropy can be determined by placing a sample of the polymer between crossed polarizers on a heating stage of a polarizing microscope and bringing the temperature up to and beyond the polymer flow temperature. If the polymer is optically anisotropic in the melt, a bright field will be observed at temperatures above the polymer flow temperature. This may be confirmed through use of the thermooptical test (TOT) which is described in U.S. Pat. No. 4,118,372. Polymers which pass this test are considered to be optically anisotropic. The apparatus is similar to that described by I. Kirshenbaum, R. B. Isaacson, and W. C. Feist, Polymer Letters, 2, 897–901 (1964).

The polyesters are prepared by combining substantially equal molar amounts of glycols and diacids. The glycols may be added in the form of diesters such as the diacetates. Alternatively the free glycol can be reacted with a dichloride of the diacid, the free acid, or esters thereof. The mixture is heated in a reaction vessel under an inert atmosphere with stirring for about 1 to 3 hours, at a temperature above the melting points of the reactants. A vacuum is usually applied during the course of the reaction to remove volatile by-product such as acetic acid.

The polymers of the present invention are useful as films which can be subjected to high temperatures.

The polyester may be spun into filament by the conventional melt spinning techniques.

The polymers of the present invention can be molded and spun into fibers in addition to being made into biaxially orientable films.

Uni- and Biaxial Stretching of Extruded or Molded Sheets

A sheet of polymer, 5 to 20 mils thick, is prepared either by extrusion through a slit die at about 300° C., or by compression molding between two plates at 320° C. for 30 seconds in a hydraulic press.

For biaxial stretching, square samples, either two or four inches on a side, cut from the sheets are mounted in a pantograph preheated to 20° C. to 80° C. above the glass transition temperatures (Tg) of the polymers (i.e. 60° to 200° C.). After thermal equilibration for 0.2 to 3 minutes, the samples are stretched either simultaneously or sequentially in the X and Y directions at rates between 100 and 20,000% per minute. A polymer is considered to be a film former if it stretchs more than 50% at a draw rate of 100%/min. after a three minute warmup period, without breaking.

For uniaxial stretching, strips 0.5 in. wide by 1.5 to 3 in. long cut from the polymer sheets are mounted in the jaws of a tensile tester which is inside a heated compartment maintained at 80° to 190° C. After a heatup time of 0.2 to 3 minutes, the samples are elongated at a rate of 20% to 500% per minute.

Physical Testing

Tensile properties were measured with an Instron machine using a constant head speed of 0.05 cm/mn at 25° C., relative humidity of 50%, and a grip distance of 2.5 cm. The modulus reported in the initial Young's modulus derived from a stress-strain curve determined without an extensiometer. Strength is the strength at break. The elongation is also the elongation at break. Whenever the sample does not break, the sign >is used.

In some cases in the Examples the units reported have been mathematically converted from the units originally recorded.

EXAMPLE 1

Preparation of 3-hydroxy,4'(4-hydroxy-phenyl)benzophenone diacetate

One hundred seventy grams (1 mole) of p-phenylphenol, 138 grams (1 mole) of 3-hydroxybenzoic acid, 400 mL of hydrogen fluoride (HF), and 170 grams of boron trifluoride were reacted for 15 hours at 0° C. under autogenous pressure in an autoclave. Then the contents were mixed in excess water/ice to precipitate a green solid. After filtering and washing with water to remove the remaining HF, the powder was slurried with water, neutralized with 80 grams sodium bicarbonate ($NaHCO_3$) until pH=8, filtered, and washed with water. After drying at 25° C. in air for 10 hours, the solid was dissolved in 3000 ml ethyl acetate, stirred overnight, and precipitated in a blender with 6000 ml n-hexane by volume. The solid was separated by filtration, washed two times with n-hexane, and dried at 120° C. under vacuum. The product was 160 grams of a beige crystalline solid which was determined by NMR analysis to be the 3-hydroxy,4'(4-hydroxyphenyl)-benzophenone. This solid was acetylated directly by refluxing 3 hours with 640 ml of acetic anhydride and one drop of concentrated sulfuric acid. The solution was cooled to 25° C. and allowed to stand overnight. The solid was filtered, washed with methanol, and dried at 90° C. under vacuum. The product was 150 grams of 100% pure 3-hydroxy, 4'-(4-hydroxyphenyl)benzophenone diacetate as determined by NMR analysis. Its melting point was 120°–121° C.

Polymerization

One hundred eighty-seven grams (0.5 mole) of 3-hydroxy,4'(4-hydroxyphenyl)benzophenone diacetate and 91.5 grams (0.525 mole) of suberic acid ($HOOC(CH_2)_6COOH$) are simultaneously introduced into a glass polycondensation reactor fitted with a mechanical stirrer, nitrogen inlet, vacuum outlet, and a reflux condenser. After purging, the reactor is heated with a Wood's metal bath set at 140° C. while vacuum is applied for 15 minutes. Then under nitrogen the contents are heated at atmospheric pressure to 235° C. where acidolysis begins. After one hour, the temperature is raised to 250° C. and maintained there until 78% of the theoretical volume of acetic acid distills over. The pressure is then gradually reduced to 5 KPa over a period of 1 hour and 20 minutes and then it is further reduced to 0.04 KPa. The reactor is maintained at 260° C. for 4 hours until the desired viscosity is obtained. The product had 200 grams of polymer having a structure as determined by NMR analysis consisting of perfectly alternating carbonyl hexamethylene carbonyl and oxy-3-benzoyl-4-phenyl-4-phenoxy units. The inherent viscosity was 0.87 dlg$^{-1}$. The polyester had a Tg of 60° C. and a liquid crystalline anisotropic-isotropic transition of 170° C.; that is, the anisotropy of the polyester melt under crossed polarized light fades at 170° C. The polyester had no solid crystalline to liquid crystalline transition ($\Delta H_f$ of 0 Joules per g). The polyester has dead bend properties.

EXAMPLE 2

A polyester prepared similarly to that of Example 1 was extruded as a film. Dimensions of the sample were 8.1×76 mm. Thickness was variable. The film was uniaxially stretched in the machine direction while heat was applied with the following conditions of temperature, elongation, speed, and drawing ratio. Results are as follows:

| Thickness (mm) | Temperature °C. | Drawing Ratio % | El. Speed cm/mn | Modulus MPa | Strength MPa | El. at Break-% |
|---|---|---|---|---|---|---|
| 0.06 | 106 | 285 | 10 | 12930 | 207 | 12 |
| 0.09 | 106 | 200 | 20 | 9655 | 207 | 12 |
| 0.11 | 96 | 200 | 20 | 8414 | 228 | 18 |

EXAMPLE 3

The polyester was the same as Example 1. It was compression molded at 190° C. with a thickness of 0.5 mm. The sheet was cut into dimensions 50×50 mm and biaxially stretched at 80° C. to 400% with a stretching speed of 200 cm/min.

The resulting film was shiny, tough, and had the following balanced properties:
Tensile Modulus MPa: 4138,
Tensile Strength MPa: 145,
Elongation At Break % 14.

EXAMPLE 4

Eighteen grams (0.048 mole) of 3-hydroxy,4'(4-hydroxyphenyl)benzophenone diacetate and 11.6 grams (0.05 mole) of 1,10-decanedicarboxylic acid were simultaneously introduced into a glass polycondensation reactor fitted with a mechanical stirrer, nitrogen inlet, vacuum outlet, and a reflux condenser. After purging, the reactor was heated to 190° C. for 20 minutes; then the temperature was raised to 265° C. where the acetic acid began to distill. After 55 minutes, 80% of the theoretical volume of acetic acid distilled over. The pressure was gradually reduced to 5 KPa for 10 minutes and then further reduced to 0.07 KPa for 20 minutes at 280° C. The yield of polymer was 90% of theoretical. The inherent viscosity was 1.23 dlg$^{-1}$. The polyester had a Tg of 48° C. and a liquid crystalline anisotropic-isotropic transition at 135° C.; that is, the anisotropy of the polyester melt under crossed polarized light faded at 135° C. There was no solid crystalline to liquid crystalline transition, i.e., $\Delta H_f = 0$ Joules per gram. The polyester was analyzed by NMR to consist of perfectly alternating carbonyl and oxy-3-benzoyl-4-phenyl-4-phenoxy units. Films of the polyester were compression molded at 175° C. to provide test specimens having dimensions of 0.3×2×21.5 mm. Results were as follows:
Tensile Modulus MPa: 566,
Tensile Strength MPa: 41,
Elongation At Break %: 77.

The above polyester test specimen was cold drawn 120% with new dimensions of 0.2×1.78×23.4 mm. Results are as follows:
Tensile Modulus MPa: 1800,
Tensile Strength MPa: 72,
Elongation At Break %: 30.

EXAMPLE 5

A polyester prepared as in Example 4 was compression molded into a sheet and cut into a square shape 50×50 mm. It was biaxially stretched 100% at 60° C. Results are as follows:
Tensile Modulus MPa: 2000,
Tensile Strength MPa: 110,
Elongation At Break %: 22.

EXAMPLE 6

561 g (1.5 mole) of 3-hydroxy,4'-(4-hydroxyphenyl)-benzophenone diacetate, 150 g (0.9 mole) of terephthalic acid and 100 g (0.6 mole) of isophthalic acid were simultaneously introduced into a glass polycondensation reactor similar to Example 1. After purging the reactor was heated using a Wood's metal bath at from 185° C. to 300° C. for 1 hr. 15 min. then to 330° C. for 1 hr. 160 cc of acetic acid was collected. The nitrogen is blown in for 30 mn. The temperature was decreased to 290° C. The pressure was gradually reduced to 5 KPa for 35 min. and then further reduced to 0.01 KPa for 1 hr 10 min. at 300° C., for 15 min. at 320° C. and for 1 hr 30 min. at 330° C. The pressure was then decreased to 0.009 KPa for 1 hr 15 min. The yield of the polymer was 94% of theoretical. The inherent viscosity was 1.2 dlg$^{-1}$. The polyester has a Tg of 132° C., a liquid crystalline phase up to >350° C. and a $\Delta H_f$ of 0 J/g.

The polymer was melted in an extruder at 330° C. and extruded through a 20 cm lip die at 300° C. to produce a film with a thickness of 0.1 to 0.18 mm. The extruded film was quenched on a cooled casting drum to give a smooth film.

The film was then cut into a 5×5 cm sheet which was uniaxially and biaxially stretched at 185° C. to give a smooth shiny and thin (25 to 50 μm thick) film. Strips were cut from these films in the extruded (machine direction) and 90° of the extruded (transverse direction) film. Tensile properties from nonheat-treated samples were:

| Stretching Ratio | | Machine Direction | | | Transverse Direction | | |
|---|---|---|---|---|---|---|---|
| MD (%) | TD (%) | Modulus Kpsi (MPa) | Strength Kpsi (MPa) | E-long % | Modulus Kpsi (MPa) | Strength Kpsi (MPa) | E-long % |
| 0 | 0 | 1500 (10300) | 32 (220) | 5 | 300 (2100) | 4 (30) | 2 |
| 0 | 200 | 1200 (8300) | 25 (170) | 25 | 1100 (7600) | 21 (140) | 11 |
| 100 | 200 | 2400 (16600) | 51 (350) | 10 | 800 (5500) | 16 (110) | 16 |

EXAMPLE 7

112.2 g (0.3 mole) of 3-hydroxy, 4'-(4-hydroxyphenyl)benzophenone diacetate, 39 g (0.8 mole) of 2,6 naphthalene diacid and 20 g (0.12 mole) of isophthalic acid were simultaneously introduced into a glass polycondensation reactor as in Example 1. After purging with nitrogen, the reactor was heated using a Wood's metal bath at from 185° to 310° C. for 1 hr 50 mins. Thirty-one cc of acetic acid was collected. Nitrogen was blown in for 20 mins. Partial vacuum (5 KPa) was applied for 15 mins and full vacuum (0.03 KPa) for 5 hrs. The yield was 99% (134 g). The inherent viscosity was 0.8 dlg$^{-1}$. The glass transition temperature was 134° C. as determined by DSC. The polymer had a liquid crystalline phase up to 350° C. as determined by optical microscopy and a $\Delta H_f$ of 0 J/g.

A molded film of the polymer was uniaxially stretched 100% at 170° C.

EXAMPLE 8

109.4 g (0.292 mole) of 3-hydroxy, 4'-(4-hydroxyphenyl)benzophenone diacetate, 49.6 g (0.205 mole) of paradibenzoic acid, and 14.6 g (0.088 mole) of isophthalic acid were simultaneously introduced into a glass polycondensation reactor as in Example 1. After purging, the reactor was heated with Wood's metal bath to 300° C. for 2 hrs 25 mins. Partial vacuum (5 KPa) was applied for 15 mins then full vacuum (0.03 KPa) for 3 hrs 45 mins at 330° C. The yield of polymer is 92%. The inherent viscosity was 1.5 dlg$^{-1}$. The glass transition temperature was 133° C. as determined by a differential scanning calorimeter (DSC). The polymer had a liquid crystalline phase up to above 350° C. as determined by optical microscopy and a $\Delta H_f$ of 0 J/g. Compression molded film can be stretched up to 100% at 160°–180° C.

EXAMPLE 9

45 grams (0.12 mole) of 3 hydroxy-4'-(4-hydroxyphenyl)benzophenone diacetate, 65 grams (0.28 mole) of chlorohydroquinone diacetate, 46.5 g. (0.28 mole) of terephthalic acid and 20 g. (0.12 mole) of isophthalic acid were introduced into a glass polycondensation reactor. After purging, with nitrogen, the reactor was heated in a Wood's metal bath from 185° to 310° C. for 1 hr. 40 min.—43 ml. of acetic acid was distilled. The temperature was increased to 330° C. for 20 min. then nitrogen was blown in for 1 hr. The temperature was then decreased to 290° C. for 30 min. Partial vacuum (5 KPa) was applied for 20 min., then full vacuum (0.03 KPa) for 15 min. at 290° C. and 2 hrs. 25 min. at 320° C. The yield of polymer was 92% (117 g.). The inherent viscosity was 1.4 dlg$^{-1}$. The Tg was 115° C. as determined by DSC and the $\Delta H_f$ was 0 J/g.

The polymer was compression molded at 320° C. and then biaxially stretched at 165° C. at a rate of 500% per minute.

| Direction | % Stretch | Tensile Modulus (Kpsi) | Tensile Strength (Kpsi) | Elong. Break. % |
|---|---|---|---|---|
| X | 200 | 2500 | 37 | 1.8 |
| X | 100 | 1300 | 17 | 1.5 |

EXAMPLE 10

39.3 g. (0.105 mole) of 3 hydroxy-4'-(4-hydroxyphenyl)benzophenone diacetate, 66.2 g. (0.245 mole) of phenylhydroquinone diacetate, 40.7 g. (0.245 mole) of terephthalic acid and 17.4 g. (0.105 mole) of isophthalic acid were introduced into a glass polycondensation reactor. After purging, with nitrogen, the reactor was heated in a Wood's metal bath from 185° to 310° C. for 2 hr. 45 min. Thirty-four (34) ml. of acetic acid was collected—then nitrogen was blown in for 1 hour. Partial vacuum was applied for 15 min. and then full vacuum (0.03 KPa) for 3 hr 20 min. at 310° C. The yield was 91% (110 g.). The inherent viscosity was 0.5 dlg$^{-1}$. The Tg was 146° C. as determined by DSC. The $\Delta H_f$ was 0 Joules per gram.

The polymer was compression molded at 320° C. and uniaxially stretched at 160° C. up to 100% (2×). The rate of stretching was 4000%/min.

EXAMPLE 11

Seven and five-tenths grams (0.02 mole) of 3-hydroxy-4'(4-hydroxyphenyl)benzophenone diacetate, 3.9 grams (0.02 mole) of hydroquinone diacetate, 6 grams (0.036 mole) of terephthalic acid, 0.7 grams (0.004 mole) of isophthalic acid were simultaneously introduced into a 250 ml glass polycondensation reactor fitted with a mechanical stirrer, nitrogen inlet, vacuum outlet and a reflux condenser. After purging with nitrogen, the reactor was heated with a Wood's metal bath from 100° C. to 280° C. for 2 hrs., then 1 hr. at 300° C. Nitrogen was blown in for ½–1 hr. Partial vacuum (5 KPa) was applied for 10 min., then full vacuum (0.03 KPa) for 3 hrs. The yield is almost quantitative. The composition had an inherent viscosity (I.V.)=2.4 dlg$^{-1}$, Tg (by DSC) was 118° C., $\Delta H_f$=0 J./g, clearing temperature, Tc °C. (where the systems become isotropic) was greater than 350° C.

The polyester was compression molded at 220° C. Samples cut along the flow pattern and uniaxially stretched at 180° C. in a hot box using an Instron machine at the cross head speed of 12.5 mm/min. (0.5"/mm) to the 100% extension. The tensile strength thus obtained was 40.9 Kpsi (280 MPa).

EXAMPLE 12

One hundred four and seven-tenths grams (0.28 mole) of 3-hydroxy-4'(4-hydroxyphenyl)benzophenone diacetate, 23.3 grams (0.12 mole) of hydroquinone diacetate, 46.5 grams (0.28 mole) of terephthalic acid, and 20 grams (0.12 mole) of isophthalic acid were simultaneously introduced into a glass polycondensation reactor as Example 1. After purging with nitrogen, the reactor was heated from 180° C. to 300° C. for 3 hrs. Forty-two cc (92%) of theoretical value of acetic acid was collected. Nitrogen was blown in for 15 mins. Partial vacuum (5 KPa) was applied for 15 mins, then full vacuum (0.03 KPa) for 4 hrs 30 mins. The yield was 94% (138 grams). The inherent viscosity was 1 dlg$^{-1}$. The Tg was 131° C. as determined by DSC, $\Delta H_f$ was 0 J./g. The polymer forms a liquid crystalline phase up to above 350° C. as determined by optical microscope.

The above polymer was compression molded at 200° C. (0.25 mm thick). A sheet of 50×50 mm was cut and biaxially stretched up to 200% in each direction to give a smooth film with the following physical properties (nonheat treated):

Stretching Temperature: 150° C.,
Tensile Modulus Kpsi (MPa): 1300 (9,000),
Tensile Strength Kpsi (MPa): 22.4 (150),
Elongation at Break, %: 2.

EXAMPLE 13

36 g (0.2 moles) of p-hydroxybenzoic acid acetate, 74.8 g (0.2 moles) of 3-hydroxy-4'-(4-hydroxyphenyl)-benzophenone diacetate, 23 g (0.14 moles) of terephthalic acid and 10 g (0.06 moles) of isophthalic acid were simultaneously introduced into a glass polycondensation reactor fitted with a mechanical stirrer, nitrogen inlet, vacuum outlet and a reflux condenser. After purging, the reactor was heated using a Wood's metal bath from 185° C. to 260° C. for 1 hr 30 min. 18 ml of acetic acid which is 50% of expected amount, was collected. The temperature was increased to 265° C. for 2 hr 5 min. 28 ml of acetic acid was collected. The temperature was increased to 310° C. for 25 min. Nitrogen was blown in for 15 min. Partial vacuum (5 KPa) was applied for 15 min. then full vacuum (0.03 KPa) for 3 hr at 310° C. The yield of polymer was 91% (98 g). The inherent viscosity was 1 dlg$^{-1}$. The Tg was 116° C. as determined by DSC. It had no melting point (crystalline-liquid crystalline transition even after annealing at 220° C. for 74 hr), $\Delta H_f$ was 0 J/g.

The polyester was compression molded at 320° C. for 1 min. It was biaxially stretched at 175° C. to give a smooth and shiny film. Physical properties of film (50 μm thick) were:

| Stretching Ratio | | X Direction (Tensile) | | | Y Direction (Tensile) | | |
|---|---|---|---|---|---|---|---|
| MD (%) | TD (%) | Modulus Kpsi (MPa) | Strength Kpsi (MPa) | E-long % | Modulus Kpsi (MPa) | Strength Kpsi (MPa) | E-long % |
| 200 | 200 | 460 (3200) | 6 (40) | 1.6 | 2100 (14500) | 40 (280) | 3 |

EXAMPLE 14

54 g (0.3 moles) of p-hydroxybenzoic acid acetate, 56 g (0.15 moles) of 3-hydroxy-4'-(4-hydroxyphenylbenzophenone diacetate, 17.4 g (0.105 moles) of terephthalic acid and 7.5 g (0.045 moles) of isophthalic acid were simultaneously introduced into a reactor identical to that of Example 1. The reactor was heated from 120° C. to 260° C. for 2 hr 35 min. 28 ml of acetic acid was collected. The temperature was increased to 310° C. for 30 min. Nitrogen was blown in for 40 min. Partial vacuum (5 KPa) was applied for 15 min and full vacuum (0.03 KPa) for 3 hrs at 310° C. The yield of polymer was 91% (90 g). The inherent viscosity was 1.1 dlg$^{-1}$. The Tg was 110° C. as determined by DSC. The polymer as made did not have any crystalline phase, $\Delta H_f$ was 0 J./g.

The above polyester was compression molded at 320° C. for 1 min. It was biaxially stretched at 175° C. to give a smooth and shiny film. Physical properties of the film (50 μm or 2 mil thick) were:

| Stretching Ratio | | X Direction (Tensile) | | | Y Direction (Tensile) | | |
|---|---|---|---|---|---|---|---|
| MD (%) | TD (%) | Modulus Kpsi (MPa) | Strength Kpsi (MPa) | E-long % | Modulus Kpsi (MPa) | Strength Kpsi (MPa) | E-long % |
| 100 | 100 | 470 (3250) | 8 (55) | 2.5 | 1200 (8300) | 14 (100) | 1.8 |

EXAMPLE 15

74.8 g (0.2 mole) of 3-hydroxy, 4'(4-hydroxyphenyl)-benzophenone diacetate, 32.2 g (0.2 mole) of isophthalic acid and 72 g (0.4 mole) of p-hydroxybenzoic acid acetate were simultaneously introduced into a glass polycondensation reactor identical to Example 1. After purging, the reactor was heated using a Wood's metal bath from 185° C. to 265° C. for 2 hr. 35 min. 37 cc of acetic acid was collected. Nitrogen was blown in for 40 min. while the temperature was increased to 310° C. The pressure was gradually reduced to 5 KPa for 10 min. and then further reduced 0.07 KPa for 4 hours at 330° C. The yield was 96%. The inherent viscosity was 0.7 dlg$^{-1}$. The polyester had a Tg of 131° C. and a liquid crystalline phase up to 350° C., and a $\Delta H_f$ of 0 J/g.

The above polyester was compression molded at 320° C. for 1 min. It was biaxially stretched at 185° C. to give a smooth and shiny film. Physical properties of a non-heat-treated film (25 μm or 1 mil) were:

| Stretching Ratio | | X Direction (Tensile) | | | Y Direction (Tensile) | | |
|---|---|---|---|---|---|---|---|
| MD (%) | TD (%) | Modulus Kpsi (MPa) | Strength Kpsi (MPa) | E-long % | Modulus Kpsi (MPa) | Strength Kpsi (MPa) | E-long % |
| 100 | 100 | 900 (6200) | 20 (140) | 7.5 | 1100 (7600) | 23 (160) | 6.3 |
| 200 | 200 | 1300 (9000) | 50 (340) | 6 | 1400 (9700) | 30 (210) | 7 |

EXAMPLE 16

Preparation of 3,4'-Dihydroxybenzophenone Diacetate

Ninety-four grams (1 mole) of phenol, 138 grams (1 mole) of 3-hydroxybenzoic acid, 400 ml of hydrogen fluoride (HF), and 170 grams of boron trifluoride were allowed to react for 15 hours at 0° C. under autogeneous pressure in an autoclave. Then the reactor contents were mixed in excess water/ice. After filtering and washing the resulting green solid with water to remove the remaining HF, the powder was slurried with water, neutralized with sodium bicarbonate (NaHCO$_3$) solution until pH=8, filtered and finally washed with water. After drying at 25° C. in air for 10 hours and under vacuum at 120° C. for 12 hours, there was obtained 160 grams of a beige, crystalline solid which was determined by NMR analysis to be 3,4'-dihydroxybenzophenone. The solid was acetylated directly by refluxing 3 hours with 640 ml of acetic anhydride and one drop of concentrated sulfuric acid. The solution was added to ice/water. The resultant solid was filtered, washed with cold methanol, and dried at 60° C. under vacuum. There was obtained 150 grams of pure 3,4'-dihydroxybenzophenone diacetate as determined by NMR analysis. Its melting point was 83°-84° C.

Polymerization

Twelve grams (0.04 mole) of 3,4'-dihydroxybenzophenone diacetate, 4.6 grams (0.028 mole) of terephthalic acid and 2 grams (0.012 mole) of isophthalic acid were introduced into a glass polycondensation reactor. After purging with nitrogen, the reactor was heated in a Wood's metal bath from 185° C. to 300° C. over a 90 minute period. Then nitrogen was blown in for 10 minutes as a sweep. Partial vacuum (5 KPa) was applied for 15 mins., then full vacuum (0.03 KPa) for 5 hrs. 30 min. at 300° C. The yield of polymer was 80% (11 g). The inherent viscosity was 1.1 dlg$^{-1}$. The Tg was 127° C. as determined by DSC, $\Delta H_f$ was 0 J/g.

A polymer sheet was compression molded at 260° C. and then biaxially stretched at 160° C. at a rate of 500% per minute.

| Direction | % Stretch | Tensile Mod. (Kpsi) | Tensile Strength (Kpsi) | Elong Break % |
|---|---|---|---|---|
| X | 200 | 1800 | 34 | 2.9 |
| Y | 100 | 400 | 2 | 2.3 |

EXAMPLE 17

59.6 grams (0.2 moles) of 3,4'-dihydroxybenzophenone diacetate, 16.6 grams (0.1 mole) of terephthalic acid, 16.6 grams (0.1 mole) of isophthalic acid and 54 grams (0.3 mole) of p-hydroxybenzoic acid acetate were introduced into a glass polycondensation reactor. After purging, the reactor was heated using a Wood's metal bath from 185° C. to 205° C. for 2 hrs. 30 min.; 33 ml. acetic acid was collected. The temperature was increased to 330° C. for 30 min. Then nitrogen was blown in for 25 min. Partial vacuum (5 KPa) was applied for 15 min., then full vacuum (0.03 KPa) for 45 min. at 330° C. and 3 hours at 340° C. The yield of polymer was 92% (96 g)—the inherent viscosity was 1.6 dlg$^{-1}$. The Tg was 106° C. as determined by DSC, and a $\Delta H_f$ of 0 J./g.

The polymer was compression molded at 320° C. and then uniaxially stretched at 200° C. at a rate of 500% per minute.

| Direction | % Stretch | Tensile Mod. (Kpsi) | Tensile Strength (Kpsi) | Elong Break % |
|---|---|---|---|---|
| X | 200 | 2000 | 54 | 3 |
| X | 0 | 500 | 12 | 38 |

EXAMPLE 18

One hundred twelve grams (0.3 mole) of 3-hydroxy-4'(4-hydroxyphenyl)benzophenone diacetate and 51 grams (0.3 mole) of 1,4 transcyclohexane dicarboxylic acid were simultaneously introduced into a glass polycondensation reactor fitted with a mechanical stirrer, nitrogen inlet, vacuum outlet and a reflux condenser. After purging, the reactor was heated using a Wood's metal bath at from 185° C. to 300° C. for 1 hr 35 mins. Thirty-three ml of acetic acid, which was 96% of expected amount, was collected. Then nitrogen was blown in for 1 hr. Partial vacuum (5 KPa) was applied for 15 mins., then full vacuum (0.03 KPa) for 20 mins. at 320° C., 45 mins. at 330° C., and 3 hrs 40 mins. at 350° C. The yield of polymer was 96% (122 grams). The inherent viscosity was 1.4 dlg$^{-1}$. The Tg was 110° C. as determined by DSC. It had no crystalline phase melting point transition, at $\Delta H_f = 0$ J/g.

EXAMPLE 19

One hundred fifty grams (0.4 mole) of 3-hydroxy-4'-(4-hydroxyphenyl)benzophenone diacetate, 33 grams (0.2 mole) of terephthalic acid and 33 grams (0.2 mole) of isophthalic acid were simultaneously introduced into a glass polycondensation as in Example 1. After purging with nitrogen, the reactor was heated from 100° C. to 250° C. for 1 hr 20 mins., then 2 hrs at 270° C. Thirty-three cc (70%) of the expected acetic acid was collected. Nitrogen was blown in for 45 mins. Partial vacuum (5 KPa) was applied for 15 mins. at 290° C. then full vacuum (0.03 KPa) for 2 hrs 40 mins. Another vacuum (0.04 KPa) at 300° C. was needed for 6 hrs 30 mins. The inherent viscosity was 1 dlg$^{-1}$. The Tg was 138° C. as determined by DSC, $\Delta H_f$ was 0 J./g. The polymer formed a liquid crystalline phase up to above 350° C. as determined by optical microscope. Tough film was compression molded at 220° C. under 4500 kg for 1 min. It was biaxially stretched at 190° C. to 200% to give a smooth, shiny, and balanced film. Physical properties of a film (40 μm or 1.5 mil thick) were:

| | | |
|---|---|---|
| Tensile Modulus Kpsi (MPa) | 800 | (5,500) |
| Tensile Strength Kpsi (MPa) | 51 | (350) |
| Elongation at Break, % | 10 | |

EXAMPLE 20

One hundred fifty grams (0.4 mole) of 3-hydroxy-4'-(4-hydroxyphenyl)benzophenone diacetate, 46.5 grams (0.28) of terephthalic acid and 20 grams (0.12 mole) of isophthalic acid were simultaneously introduced into a glass polycondensation reactor as in Example 1. After purging with nitrogen, the reactor was heated using a Wood's metal bath from 185° C. to 300° C. for 2 hrs. Forthy-one cc (85%) of acetic acid was collected. Nitrogen was blown in for 10 mins. Partial vacuum (5 KPa) was applied for 30 mins. then full vacuum (0.03 KPa) for 3 hrs 30 mins. The yield was 96% (162 grams). The inherent viscosity was 1 dlg$^{-1}$. The Tg was 127° C. as determined by DSC, $\Delta H_f$ was 0 J./g. The polymer had a liquid crystalline phase up to above 350° C. as determined by optical microscope.

The above polyester was compression molded at 220° C. for 1 min. It was biaxially stretched at 185° C. to 200% to give a smooth, shiny film. Physical properties of a nonheat-treated film (25 μm or 1 mil thick) were:

| | | |
|---|---|---|
| Tensile Modulus Kpsi (MPa) | 1800 | (12,400) |
| Tensile Strength Kpsi (MPa) | 34 | (230) |
| Elongation at Break, % | 3 | |

EXAMPLE 21

One hundred twelve and two-tenths grams (0.3 mole) of 3-hydroxy-4'-(4-hydroxyphenyl)benzophenone diacetate, 39.8 grams (0.24 mole) of terephthalic acid and 10 grams (0.06 mole) of isophthalic acid were simultaneously introduced into a glass polycondensation reactor as in Example 1. After purging with nitrogen, the reactor was heated using a Wood's metal bath from 185° C. to 300° C. for 2 hrs 15 mins. Thirty-one cc (91%) of acetic acid was collected. Nitrogen was blown in for 15 mins. Partial vacuum (5 KPa) was applied for 15 mins. and full vacuum (0.03 KPa) for 1 hr 5 mins. at 300° C. and 3 hrs 40 mins. at 310° C. The yield was 94% (120 grams). The inherent viscosity was 1.1 dlg$^{-1}$. The Tg was 118° C. as determined by DSC, $\Delta H_f$ was 0 J./g. The polymer had a liquid crystalline phase up to above 350° C. as determined by optical microscope.

The above polymer was compression molded at 220° C. for 1 min. It was biaxially stretched at 185° C. up to 300% to give a smooth, shiny and balanced film. Physical properties of a nonheat-treated film 50 μm or 2 mil were:

| | | |
|---|---|---|
| Tensile Modulus Kpsi (MPa) | 2200 | (15,200) |
| Tensile Strength Kpsi (MPa) | 33 | (230) |
| Elongation at Break, % | 2 | |

EXAMPLE 22

One hundred thirty-one grams (0.35 mole) of 3-hydroxy-4'-(4-hydroxyphenyl)benzophenone diacetate, 49.4 grams (0.3 mole) of terephthalic acid and 8.7 grams (0.05 mole) of isophthalic acid were simultaneously introduced into a glass polycondensation reactor as in Example 1. After purging with nitrogen, the reactor was heated using a Wood's metal bath from 185° C. to 300° C. for 2 hrs 5 mins. Thirty-five cc (83%) of acetic acid was collected. Nitrogen was blown in for 10 mins. Partial vacuum (5 KPa) was applied for 15 mins. and full vacuum (0.03 KPa) for 1 hr 30 mins. at 300° C. and 3 hrs 30 mins. at 310° C. The yield was 93% (136 grams). The inherent viscosity was 1.2 dlg$^{-1}$. This polymer had a $\Delta H_f$ of 1.92 J/g and for this reason is outside the scope of the present invention. The Tg was 112° C. as determined by DSC. The polymer had a liquid crystalline phase up to above 350° C. as determined by optical microscope.

The above polymer was compression molded at 220° C. for 1 min. It could not be biaxially stretched at 185° C. to give an oriented film. This was a strong distinction from polymers of the present invention where compression molded film could be biaxially stretched.

EXAMPLE 23

One hundred thirty-one grams (0.35 mole) of 3-hydroxy-4'-(4-hydroxyphenyl)benzophenone diacetate, 52.3 grams (0.315 mole) of terephthalic acid, 5.8 grams (0.035 mole) of isophthalic acid were simultaneously introduced into a glass polycondensation reactor as in Example 1. After purging with nitrogen, the reactor was heated using a Wood's metal bath from 185° C. to 300° C. for 2 hrs 15 mins. Thirty-four cc (85%) of acetic acid was collected. Nitrogen was blown in for 15 mins. Partial vacuum (5 KPa) was applied for 15 mins. and full vacuum (0.03 KPa) for 1 hr 30 mins. at 300° C. and 2 hrs 30 mins. at 310° C. The yield was 89% (132 grams). The inherent viscosity was 1 dlg$^{-1}$. The Tg was 116° C. as determined by DSC. This polymer had a solid crystalline-liquid crystalline transition at 230° C. with a $\Delta H_f$ of 5.3 J./g and for this reason is outside the scope of the present invention. The polymer had a liquid crystalline phase up to above 350° C. as determined by optical microscope.

The above polymer was compression molded at 220° C. for 1 min to give a very brittle film. It could not be biaxially stretched at <185° C. to give an oriented film. This was a strong distinction from Example 21 where compression molded film could be biaxially stretched.

EXAMPLE 24

Fourteen and nine-tenths grams (0.04 mole) of 3-hydroxy-4'-(4-hydroxyphenyl)benzophenone diacetate and 6.6 grams (0.04 mole) of terephthalic acid were simultaneously introduced into a glass polycondensation reactor as in Example 2. After purging with nitrogen, the reactor was heated using a Wood's metal bath from 185° C. to 300° C. for 1 hr 30 mins. Four cc (83%) of acetic acid was collected. Nitrogen was blown in for 45 mins. Partial vacuum (5 KPa) was applied for 5 mins. and full vacuum (0.03 KPa) for 3 hrs at 300° C. and 1 hr 25 mins. at 320° C. The yield of polymer was 72% of theoretical (12 grams). The Tg at 107° C. and a transition solid crystalline-liquid crystalline at 291° C. were determined by DSC. The $\Delta H_f$ was 7.7 J./g. The liquid crystalline liquid phase persisted up to above 350° C. as determined by optical microscope. Compression-molded film at 340° C. was very brittle and could not be stretched as in Example 21.

Examples 25 and 27 illustrate that some of the ester links of the polymers of the present invention can be replaced with amide links without materially affecting the essential properties of the resulting polymers.

EXAMPLES 25–26

X grams of 3-hydroxy-4'-(4-hydroxyphenyl)-benzophenone diacetate, y grams of p-aminophenol diacetate, z grams of terephthalic acid and k grams of isophthalic acid were simultaneously added into a glass polycondensation reactor as in Example 2. After purging, the reactor was heated to 260° C. for 2 hrs 30 mins. then for 1 hr at 300° C. Usually 3 to 4 cc of acetic acid were collected. Nitrogen was blown in for 30 mins. Partial vacuum (5 KPa) was applied for 10 mins. and full vacuum (0.03 KPa) for 3 hrs. The yield was almost quantitative (90–95%). The composition, the inherent viscosity (I.V. dlg$^{-1}$) the Tg °C. (as determined by DSC), the injection-molding temperature (°C.) and the tensile strength of nonheat-treated samples and the $\Delta H_f$ are reported in Table I.

TABLE I

| Ex. | mPCOPPG* Diacetate x Mole | | Aminophenol Diacetate y Mole | | Terephth. Acid z Mole | | Isophth. Acid k Mole | | Tg. °C. | I.V. dlg$^{-1}$ | Inj. Temp. °C. | Ten. Strength | | $\Delta H_f$ J./g |
|---|---|---|---|---|---|---|---|---|---|---|---|---|---|---|
| | g | Ratio % | g | Ratio % | g | Ratio % | g | Ratio % | | | | Kpsi | (MPa) | |
| 25 | 9 | 60 | 3.1 | 40 | 3.3 | 50 | 3.3 | 50 | 154 | 1.2 | 280 | 16.4 | (110) | 0 |
| 26 | 7.5 | 50 | 3.8 | 50 | 3.3 | 50 | 3.3 | 50 | 163 | 1 | 280 | 17 | (117) | 0 |

*mPCOPPG diacetate = 3 hydroxy,4'(hydroxy phenyl)benzophenone diacetate

EXAMPLE 27

Thirteen and four-tenths grams (0.036 mole) of 3-hydroxy-4'-(4-hydroxyphenyl)benzophenone diacetate, 0.77 gram (0.004 mole) of p-phenylene diamine diacetate, 3.3. grams (0.02 mole) of terephthalic acid and 3.3 grams (0.02 mole) of isophthalic acid were simultaneously introduced into a glass polycondensation reactor as in Example 2. After purging with nitrogen, the reactor was heated using a Wood's metal bath from 100° C. to 260° C. for 1 hr 45 mins., then to 280° C. for 2 hrs. Three cc (63%) of acetic acid was collected. Nitrogen was blown in for 45 mins. Partial vacuum (5 KPa) was applied for 10 mins. and full vacuum (0.03 KPa) for 45 mins. at 280° C. and 2 hrs at 300° C. The yield was 94% (15 grams). The inherent viscosity was 0.8 dlg$^{-1}$. The Tg was 148° C. as determined by DSC, and a $\Delta H_f$ of 0 J./g. It had a liquid crystalline phase up to above 350° C. as determined by optical microscope.

I claim:

1. A melt anisotropic polyester having an inherent viscosity of at least 0.5 as measured from a 0.5 g solution of polymer in 100 ml of an equal volume mixture of p-chlorophenol and 1,2-dichloroethane, and a heat of fusion of less than 1.5 joule per gram consisting essentially of at least 10 mole percent glycol derived repeating units of the structure

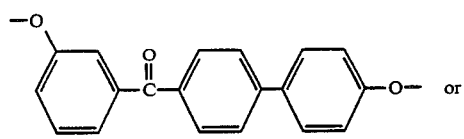 or

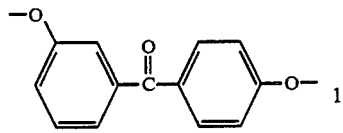

and the remainder, repeating glycol derived units of the structure —O—R—O— where —R— is an arylene group containing 6–14 carbon atoms, and diacid derived repeating units of the structure

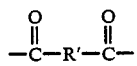

where —R'— is an alkylene group containing 4 to 14 carbon atoms or an arylene group consisting 6 to 14 carbon atoms and monoacid-monohydroxy derived repeating units of the structure

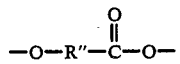

where —R"— is an arylene containing 6 to 14 carbon atoms.

2. The polyester of claim 1 wherein —R'— is alkylene and from 45 to 50 per 100 glycol derived repeating units are

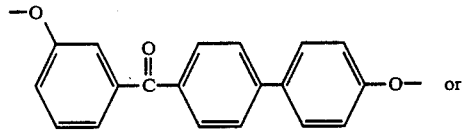 or

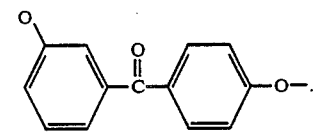

3. The polyester of claim 2 wherein from 45 to 50 per 100 glycol derived repeating units are

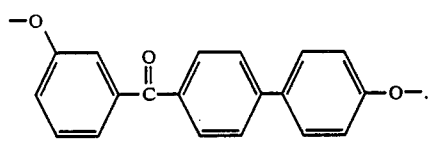

4. The polyester of claim 1 consisting essentially of repeating units

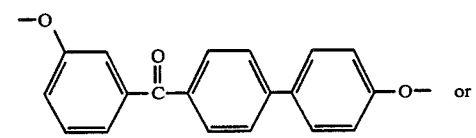 or

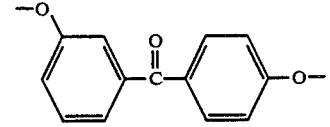

and units of the structure

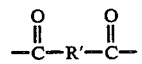

wherein from 20 to 90 per per 100 diacid derived repeating units are —R'— units of the structure

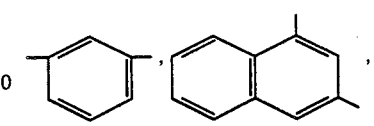

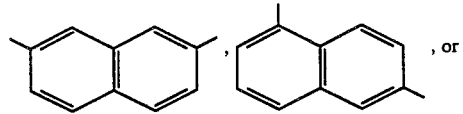

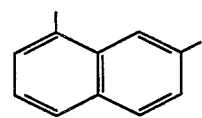

and from 80 to 10 per 100 glycol derived repeating units are —R'— units of the structure

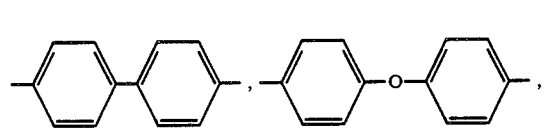

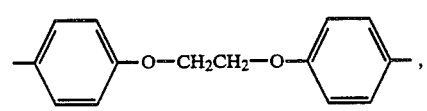

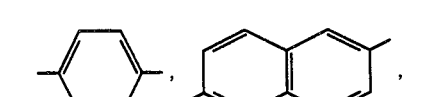

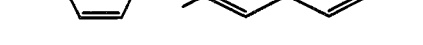

-continued

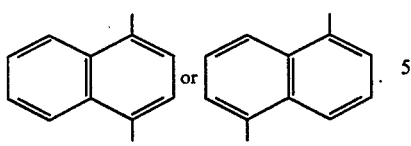 or 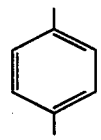

5. The polyester of claim 4 wherein from 20 to 90 per 100 diacid derived repeating units are —R'— units of the structure

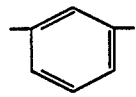

6. The polyester of claim 5 wherein the —R'— units are

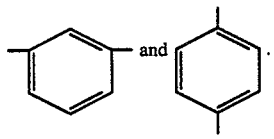

7. The polyester of claim 5 wherein the glycol derived repeating units are

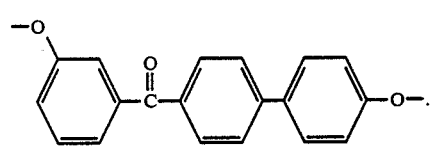

8. The polyester of claim 7 wherein from 20 to 70 per 100 glycol derived repeating units are —R'— units of the structure

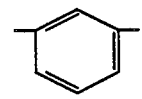

9. The polyester of claim 8 wherein from 30 to 60 per 100 glycol derived repeating units are —R'— units of the structure

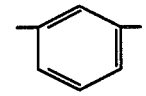

10. The polyester of claim 9 wherein the remaining —R'— units are

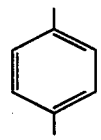

11. The polyester of claim 4 wherein the glycol derived repeating units are

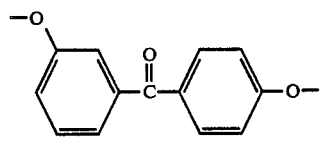

and from 20 to 60 per 100 glycol derived repeating units are —R'— units of the structure

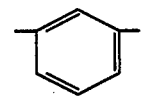

12. The polyester of claim 11 wherein from 20 to 50 per 100 glycol derived repeating units are —R'— units of the structure

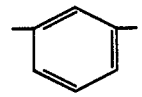

13. The polyester of claim 12 wherein from 20 to 40 per 100 glycol derived repeating units are —R'— units of the structure

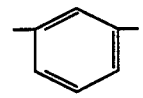

14. The polyester of claim 13 wherein the remaining —R'— units are

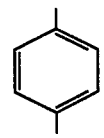

15. The polyester of claim 1 wherein from 10 to 80 per 100 diacid derived repeating units are —R'— units of the structure

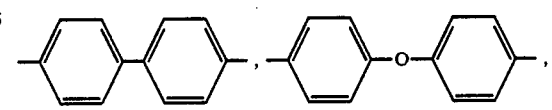

-continued

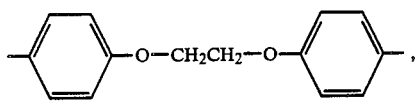

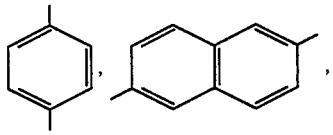

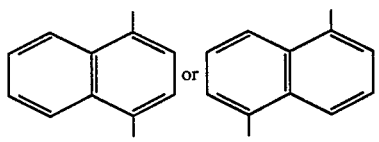

the remaining —R'— units are

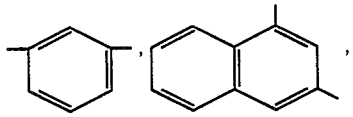

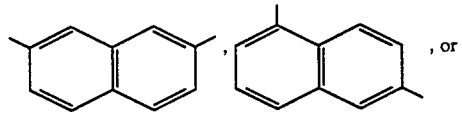

and from 70 to 100 per 100 glycol derived units are units of the structure

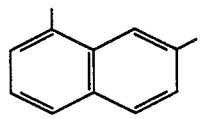

and the remaining glycol derived repeating units are

16. The polyester of claim 15 wherein from 20 to 90 per 100 diacid derived units are —R'— units of the structure

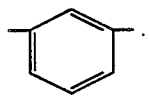

17. The polyester of claim 16 wherein from 30 to 70 per 100 diacid derived repeating units are —R'— units of the structure

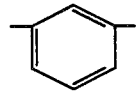

and the remaining —R'— units are

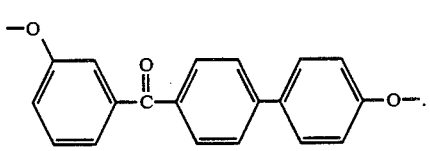

and 80 to 100 per 100 glycol derived repeating units are

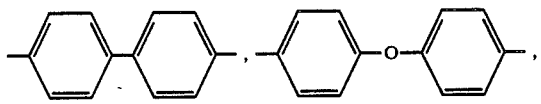

18. The polyester of claim 1 wherein from 10 to 80 per 100 diacid derived repeating units are —R'— units of the structure

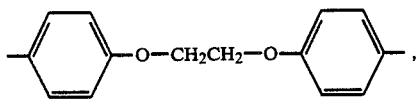

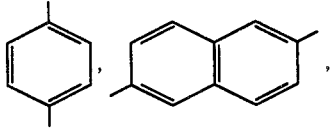

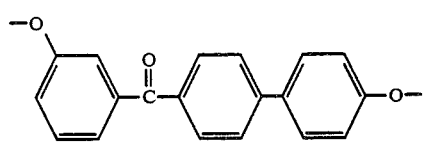

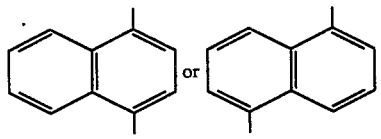

and the remaining —R'— units are

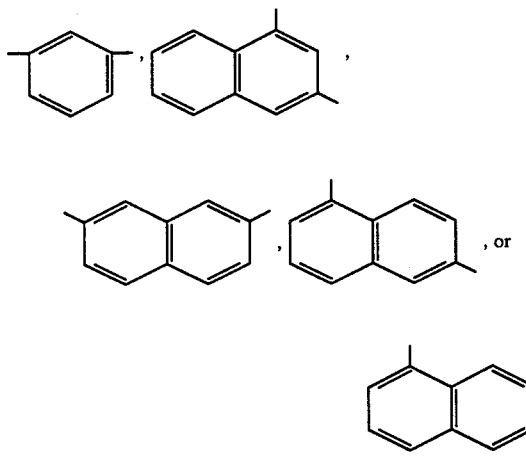

from 30 to 100 per 100 glycol derived repeating units are

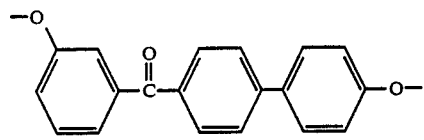

and the remaining glycol repeating units are

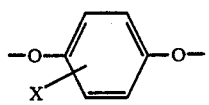

where —X is —F, —Cl, or —Br.

19. The polyester of claim 18 wherein from 20 to 90 per 100 diacid repeating units are —R'— of the structure

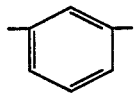

20. The polyester of claim 19 wherein from 30 to 70 per 100 diacid derived repeating units are —R'— units of the structure

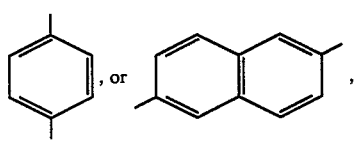

the remaining —R'— units are units of the structure

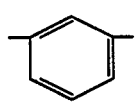

and from 40 to 100 per 100 glycol derived repeating units are units of the structure

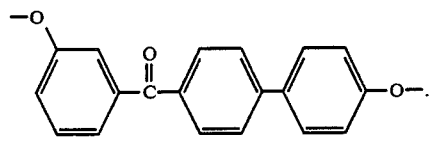

21. The polyester of claim 1 wherein from 30 to 80 per 100 diacid derived repeating units are —R'— units of the structure

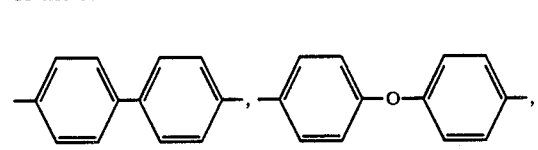

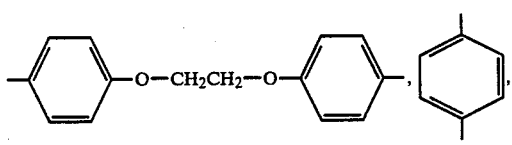

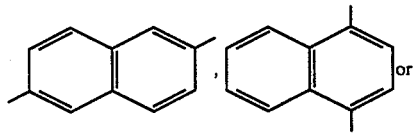

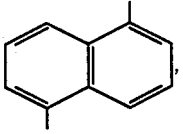

the remaining —R'— units are

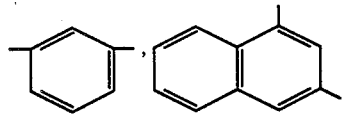

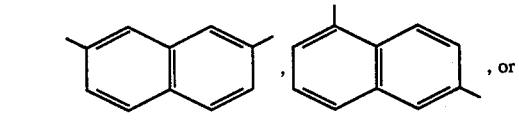

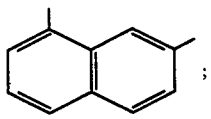

and from 20 to 100 per 100 glycol derived repeating units are units of the structure

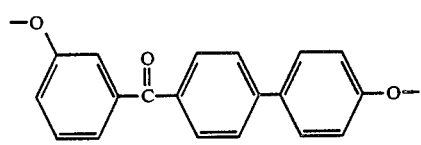

and the remaining glycol derived repeating units are

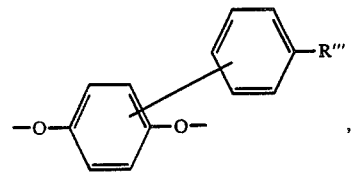

where —R''' is —H, —CH₃, —C₂H₅ or —Cl.

22. The polyester of claim 21 wherein —R''' is H.

23. The polyester of claim 22 wherein from 20 to 70 per 100 diacid repeating units are —R'— units of the structure

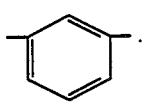

24. The polyester of claim 23 wherein —R''' is —H.

25. The polyester of claim 24 wherein from 30 to 70 per 100 diacid derived repeating units are —R'— units of the structure

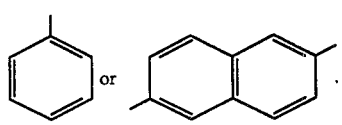

26. The polyester of claim 25 wherein from 0 to 50 per 100 glycol derived repeating units are units of the structure

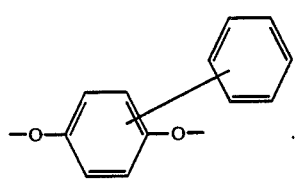

27. The polyester of claim 1 wherein from 10 to 80 per 100 diacid derived repeating units are —R'— units of the structure

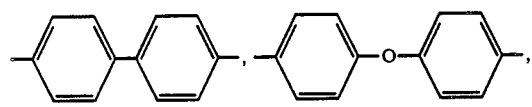

-continued

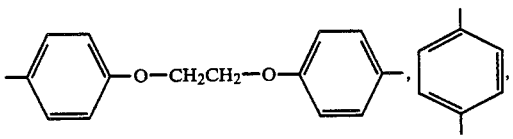

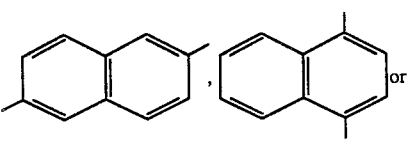

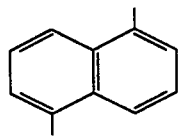

the remaining —R'— units are

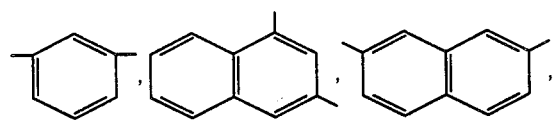

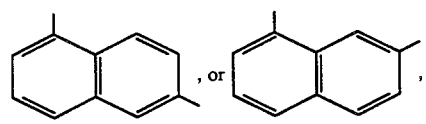

from 80 to 100 per 100 glycol derived repeating units are units of the structure

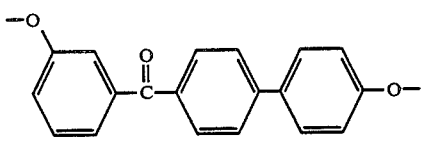

and the remaining glycol derived repeating units are

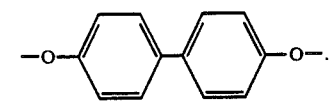

28. The polyester of claim 27 wherein from 20 to 90 per 100 diacid derived repeating units are —R'— units of the structure

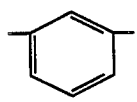

29. The polyester of claim 28 wherein from 30 to 70 per 100 diacid repeating units are —R'— units of the structure

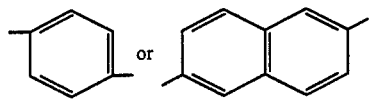

and from 85 to 100 per 100 glycol derived repeating units are units of the structure

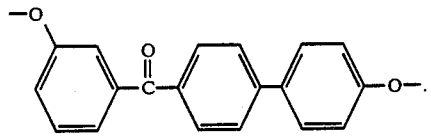

30. The polyester of claim 1 wherein from 10 to 80 per 100 diacid derived repeating units are —R'— units of the structure

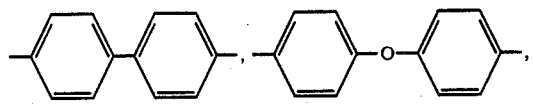

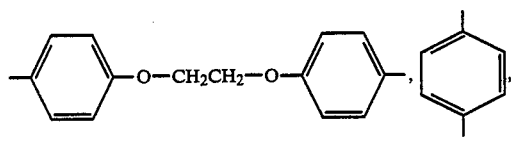

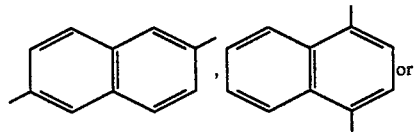

the remaining —R'— units are

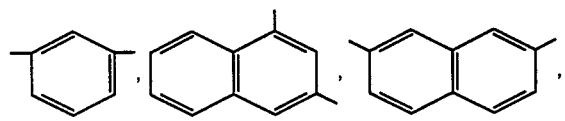

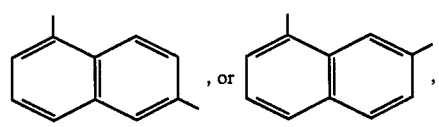

from 30 to 100 per 100 glycol derived repeating units are units of the structure

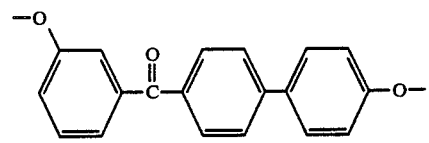

and the remaining glycol derived repeating units are

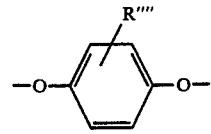

where —R'''' is —CH$_3$, —C$_2$H$_5$, —O—CH$_3$, or —OC$_2$H$_5$.

31. The polyester of claim 30 wherein from 20 to 90 per 100 diacid derived repeating units are —R'— units of the structure

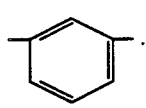

32. The polyester of claim 31 wherein from 30 to 70 per 100 diacid derived repeating units are —R'— units of the structure

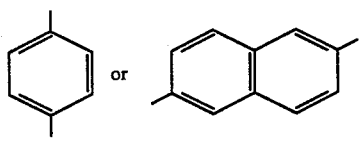

and from 50 to 100 per 100 glycol derived repeating units are units of the structure

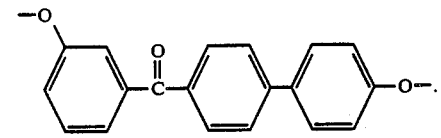

33. The polyester of claim 1 wherein from 25 to 80 per 100 diacid derived repeating units are —R'— units of the structure

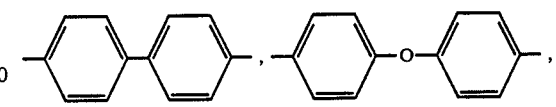

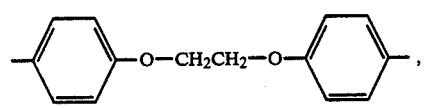

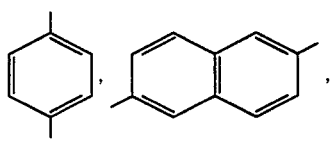

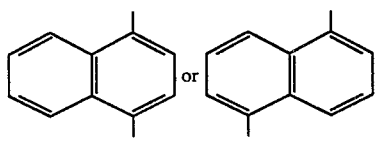

the remaining —R'— units are

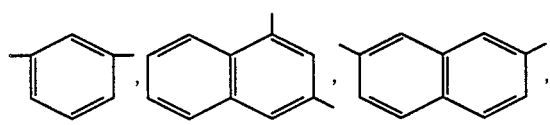

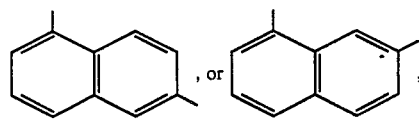

from 70 to 100 per 100 glycol derived repeating units are units of the structure

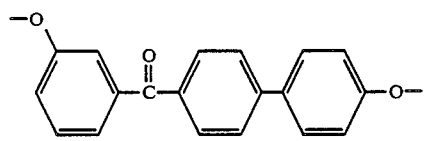

and the remaining glycol derived repeating units are of the structure

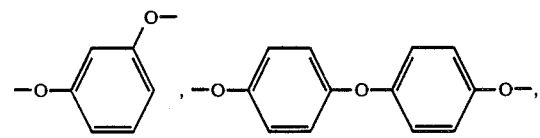

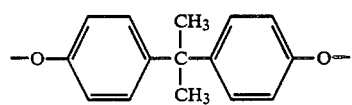

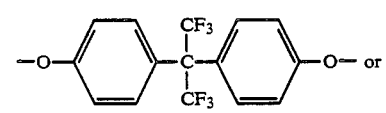

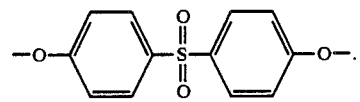

34. The polyester of claim 33 wherein from 20 to 75 per 100 diacid derived repeating units are —R'— units of the structure

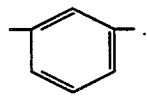

35. The polyester of claim 34 wherein from 35 to 70 per 100 diacid derived repeating units are —R'— units of the structure

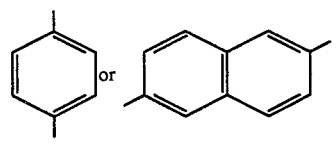

and from 80 to 100 per 100 glycol derived repeating units are units of the structure

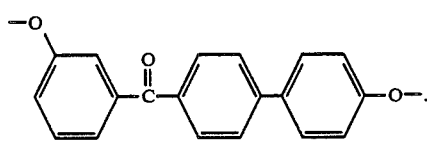

36. The polyester of claim 1 wherein from 40 to 80 per 100 diacid derived repeating units are —R'— units of the structure

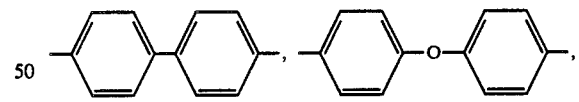

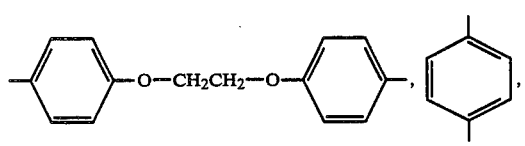

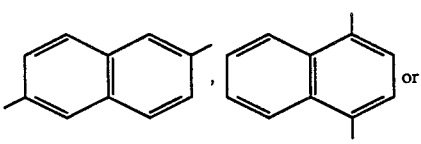

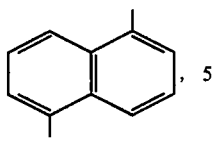, and the remaining —R'— units are

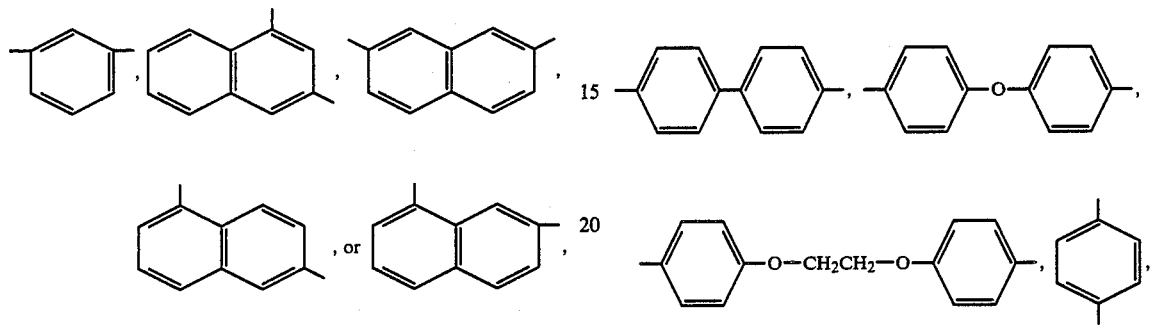

from 80 to 100 per 100 glycol derived repeating units are units of the structure

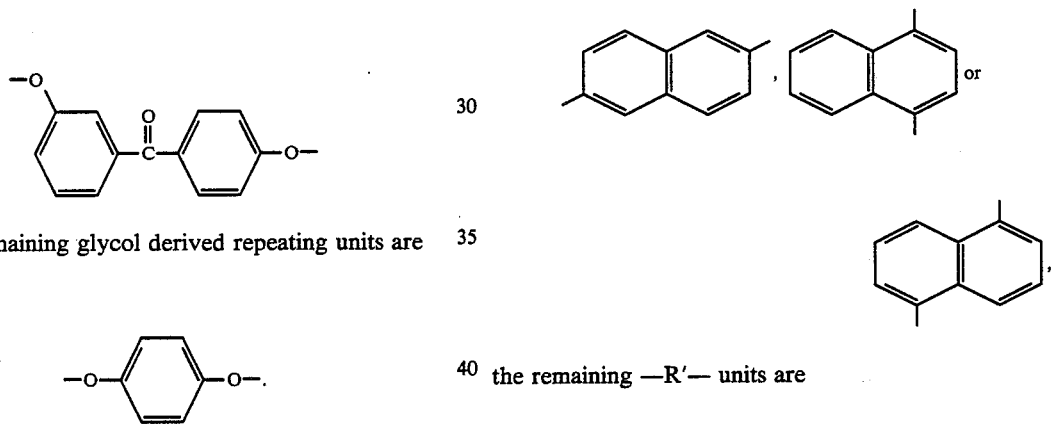

and the remaining glycol derived repeating units are

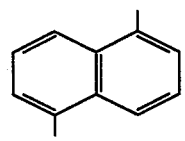.

37. The polyester of claim 36 wherein from 20 to 60 per 100 diacid derived repeating units are —R'— units of the structure

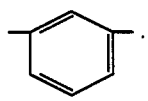.

38. The polyester of claim 37 wherein 55 to 70 per 100 diacid derived repeating units are —R'— units of the structure

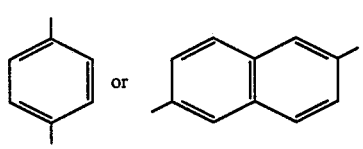

and from 87 to 100 per 100 glycol derived repeating units are units of the structure

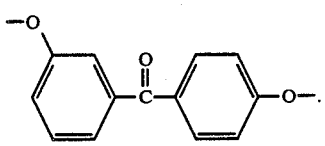

39. The polyester of claim 1 wherein from 40 to 80 per 100 diacid repeating units are —R'— units of the structure the remaining —R'— units are

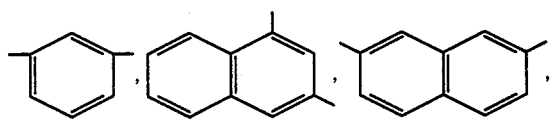

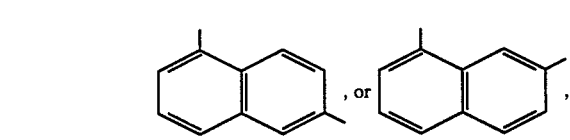

from 55 to 100 per 100 glycol derived repeating units are units of the structure

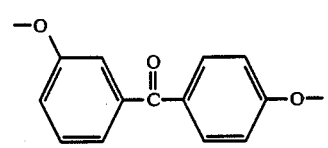

and the remaining glycol derived repeating units are

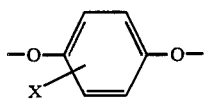

where —X is —F, —Cl or —Br.

40. The polyester of claim 39 wherein from 20 to 60 per 100 diacid derived repeating units are —R'— units of the structure

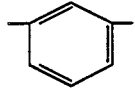

41. The polyester of claim 40 wherein from 40 to 80 per 100 diacid derived repeating units are of the structure —R'— units

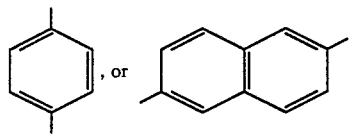

and from 60 to 100 per 100 glycol derived repeating units are units of the structure

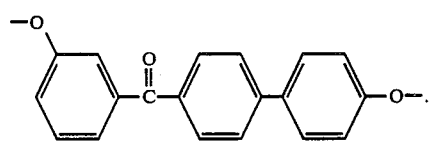

42. The polyester of claim 1 wherein from 65 to 80 per 100 diacid derived repeating units are —R'— units of the structure

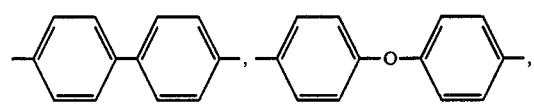

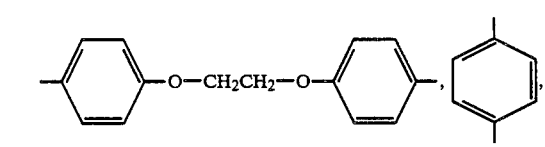

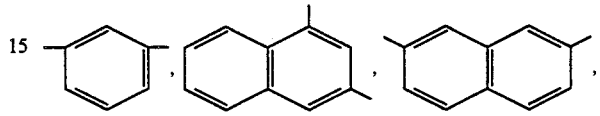

the remaining —R'— units are

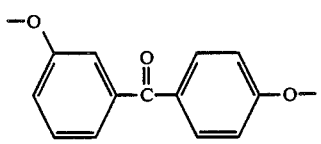

from 45 to 100 per 100 glycol derived repeating units are units of the structure and the remaining glycol derived repeating units are wherein —R''' is —H, —CH₃, —C₂H₅ or —Cl.

43. The polyester of claim 42 wherein —R''' is —H.

44. The polyester of claim 43 wherein from 20 to 35 per 100 diacid derived repeating units are —R'— units of the structure

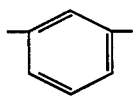

45. The polyester of claim 44 wherein from 65 to 80 per 100 diacid derived repeating units are —R'— units of the structure

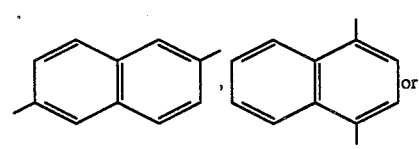

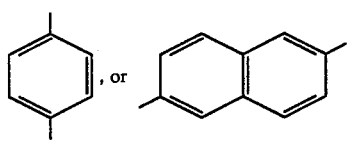, or and from 55 to 100 per 100 glycol derived repeating units are units of the structure

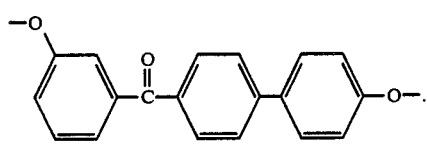

46. The polyester of claim 1 wherein from 40 to 80 per 100 diacid derived repeating units are —R'— units are

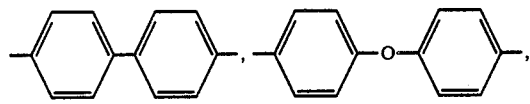

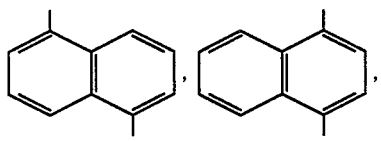

and the remaining —R'— units are

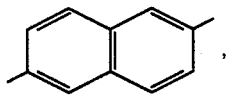

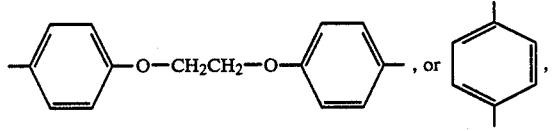

from 85 to 100 per 100 glycol derived repeating units are units of the structure

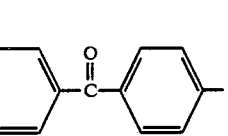

and the remaining glycol derived repeating units are

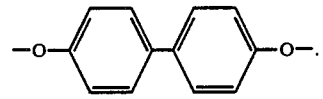

47. The polyester of claim 46 wherein from 20 to 60 per 100 diacid derived repeating units are —R'— units of the structure

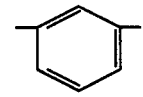

48. The polyester of claim 47 wherein from 55 to 70 per 100 diacid derived repeating units are —R'— units of the structure

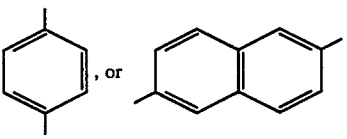

and from 90 to 100 per 100 glycol derived repeating units are units of the structure

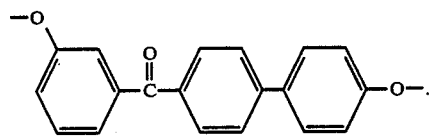

49. The polyester of claim 1 wherein from 50 to 80 per 100 diacid derived repeating units are —R'— units of the structure

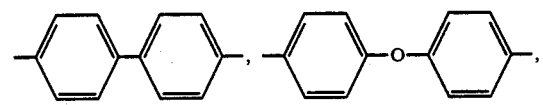

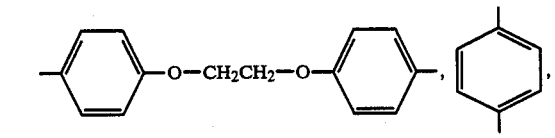

-continued

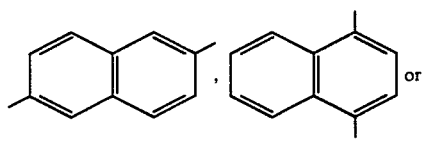

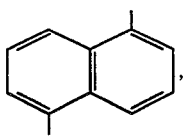

the remaining —R'— units are

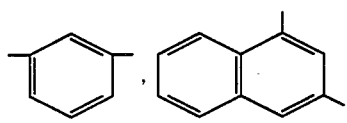

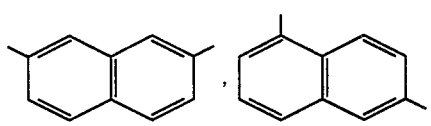

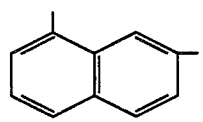

or from 30 to 100 glycol derived repeating units are of the structure

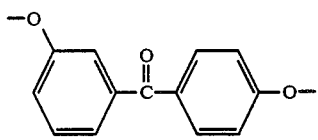

and the remaining glycol derived repeating units are

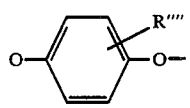

where —R''''— is —CH$_3$, —C$_2$H$_5$ or —OCH$_3$ or —OC$_2$H$_5$.

50. The polyester of claim 49 wherein from 20 to 50 per 100 diacid derived repeating units are —R'— units of the structure

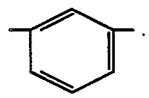

51. The polyester of claim 50 wherein from 50 to 80 per 100 diacid repeating units are —R'— units of the structure

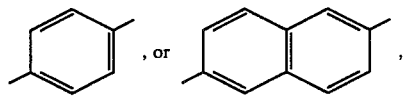

and from 50 to 100 glycol derived repeating units are of the structure

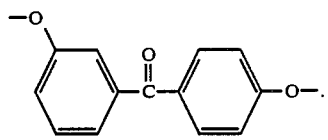

52. The polyester of claim 1 wherein from 40 to 70 per 100 diacid derived repeating units are —R'— units of the structure

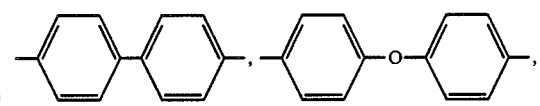

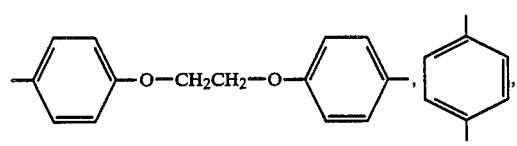

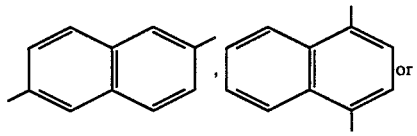

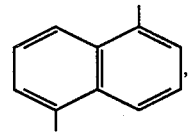

the remaining —R'— units are

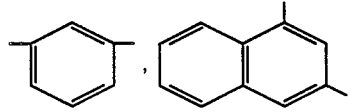

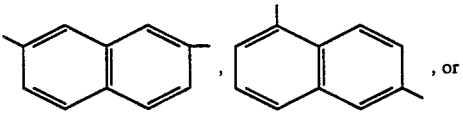

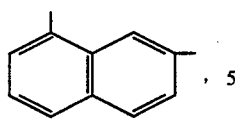

from 80 to 100 per 100 glycol derived repeating units are units of the structure

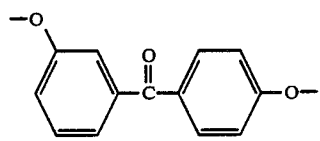

and the remaining glycol derived repeating units are

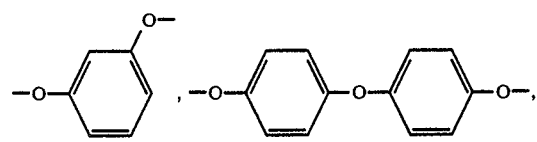

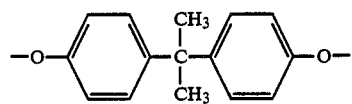

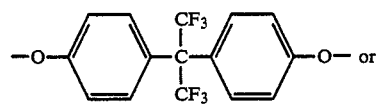

53. The polyester of claim 52 wherein from 30 to 60 per 100 diacid derived repeating units are units of the structure

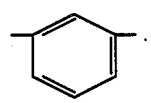

54. The polyester of claim 53 wherein from 55 to 70 per 100 diacid derived repeating units are —R'— units of the structure

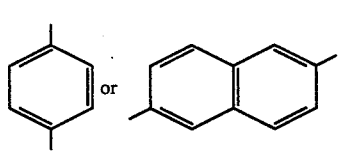

and from 85 to 100 per 100 glycol derived repeating units are units of the structure

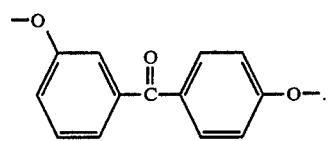

55. The polyester of claim 1 wherein the glycol derived units are

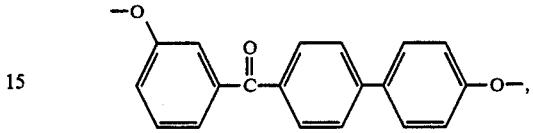

there are from 20 to 100 per 100 diacid derived repeating units of —R'— units of the structure

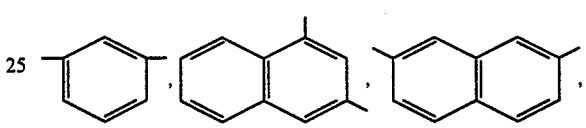

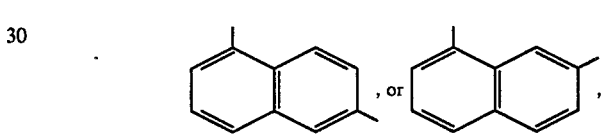

from 0 to 80 per 100 diacid derived repeating units are —R'— units of the structure

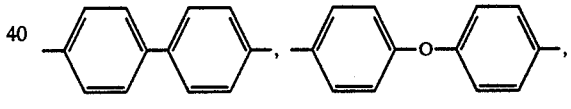

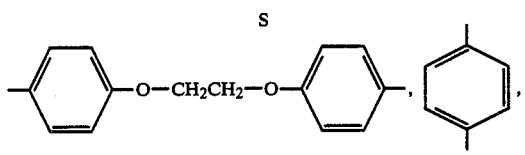

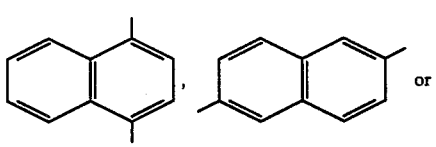

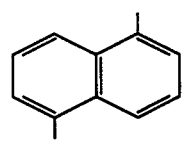

and 100 to 300 per 100 glycol derived repeating units, are hydroxy-acid derived —R''— units of the structure

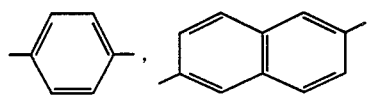

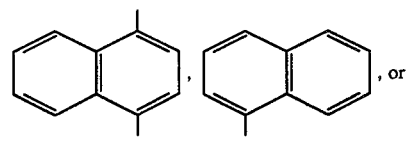

56. The polyester of claim 55 wherein from 20 to 100 per 100 diacid derived repeating units are —R'— units of the structure

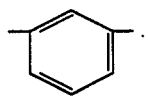

57. The polyester of claim 56 wherein there are from 30 to 100 per 100 diacid derived repeating units —R'— units of the structure

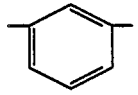

and from 150 to 250 per 100 glycol derived repeating units are hydroxy-acid derived —R"— units.

58. The polyester of claim 57 wherein there are from 50 to 100 per 100 diacid derived repeating units —R'— units of the structure

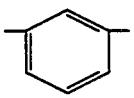

from 0 to 50 per 100 diacid derived repeating units —R'— units of the structure

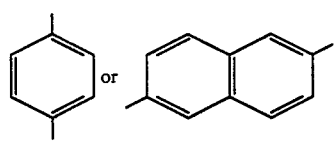

and from 150 to 200 per 100 glycol derived repeating units —R"— units of the structure

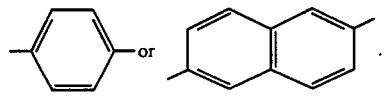

59. The polyester of claim 1 wherein the glycol derived units are

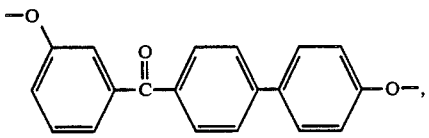

there are from 10 to 80 per 100 diacid derived repeating units —R'— units of the structure

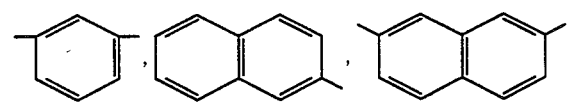

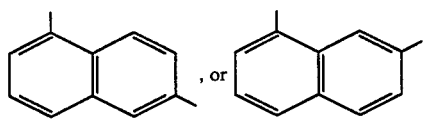

from 20 to 90 per 100 diacid derived units —R'— units of the structure

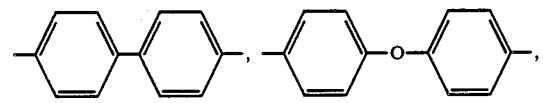

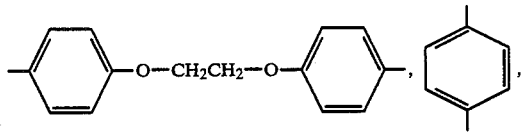

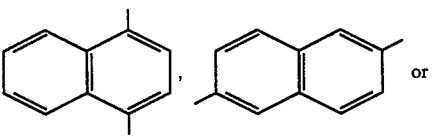

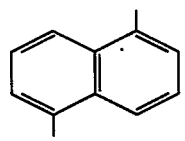

and from 30 to 99 per 100 glycol derived repeating units —R"— units of the structure

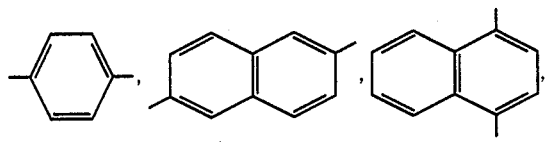 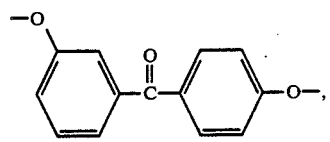

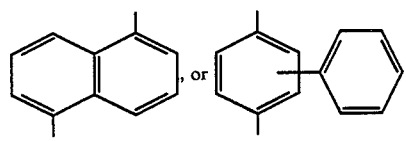

60. The polyester of claim 59 wherein there are from 10 to 80 per 100 diacid derived repeating units are —R'— units of the structure there are from 20 to 70 per 100 diacid derived repeating units are —R'— units of the structure

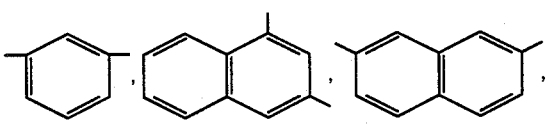

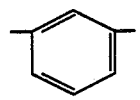

61. The polyester of claim 60 wherein there are from 15 to 35 per 100 diacid derived repeating units —R'— units of the structure

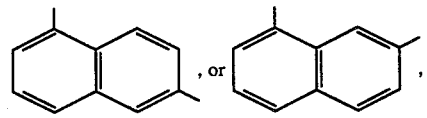

from 30 to 80 per 100 glycol derived repeating units —R'— of the structure

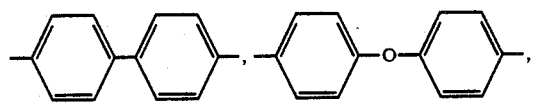

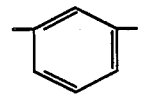

62. The polyester of claim 61 wherein there are from 25 to 35 per 100 diacid derived repeating units —R'— units of the structure

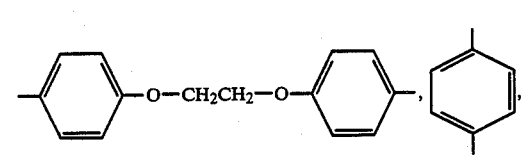

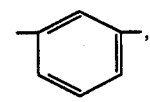, from 65 to 75 per 100 diacid derived repeating units —R'— units of the structure

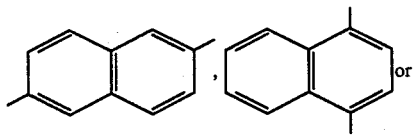

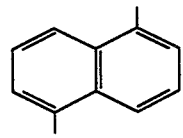

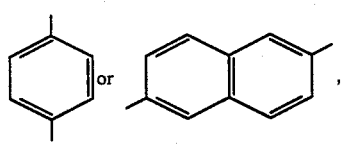

and the —R"— units are and from 100 to 300 per 100 glycol derived repeating units are hydroxy-acid derived —R"— units of the structure

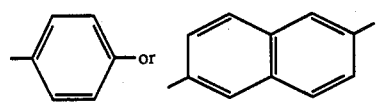

63. The polyester of claim 1 wherein the glycol derived repeating units are

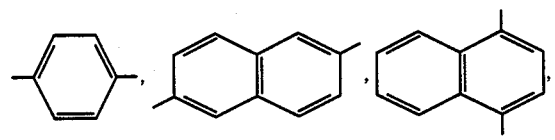

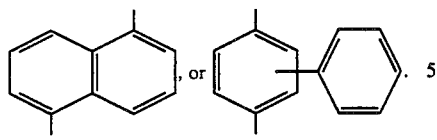

64. The polyester of claim 63 wherein there are from 20 to 70 per 100 diacid derived repeating units are —R'— units of the structure

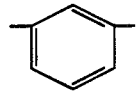

65. The polyester of claim 64 wherein there are from 30 to 70 per 100 diacid derived repeating units —R'— units of the structure

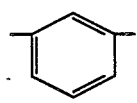, from 30 to 70 per 100 diacid derived repeating units —R'— units of the structure

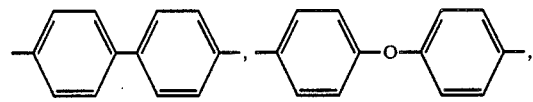

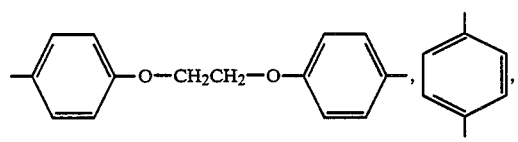

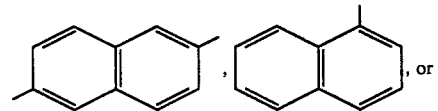

and from 150 to 250 per 100 glycol derived repeating units —R''— units.

66. The polyester of claim 65 wherein there are from 50 to 70 per 100 diacid derived repeating units —R'— units of the structure

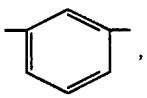, from 30 to 50 per 100 diacid derived repeating units —R'— units of the structure

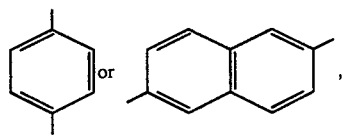, and from 150 to 200 per 100 glycol derived repeating units —R''— units of the structure

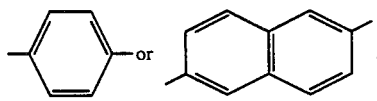.

67. The polyester of claim 1 wherein the glycol derived units are

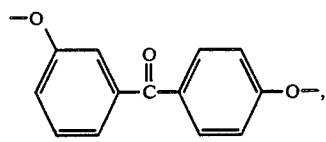

there are from 10 to 55 per 100 diacid derived repeating units —R'— units of the structure

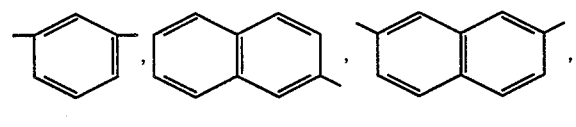

from 45 to 90 per 100 diacid derived repeating units —R'— units of the structure

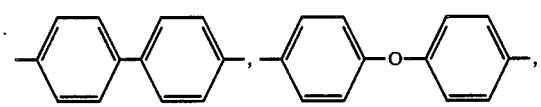

-continued

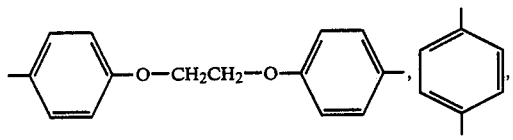

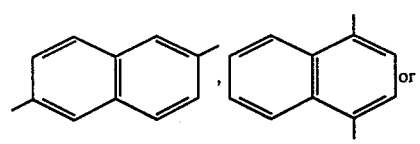

and from 30 to 99 per 100 glycol derived repeating units are hydroxy-acid derived —R"— units of the structure

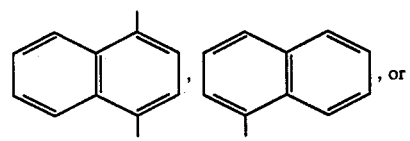

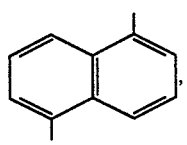

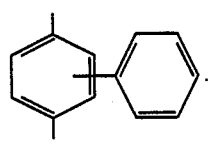

68. The polyester of claim 67 wherein from 45 to 90 per 100 diacid derived repeating units are —R'— units of the structure

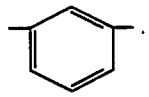

69. The polyester of claim 68 wherein there are from 15 to 35 per 100 diacid derived repeating units —R'— units of the structure

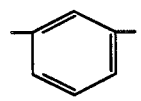

70. The polyester of claim 69 wherein from 25 to 35 per 100 diacid derived repeating units are —R'— units of the structure

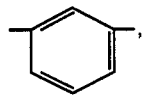

and from 65 to 75 per 100 diacid derived repeating units are —R'— units of the structure

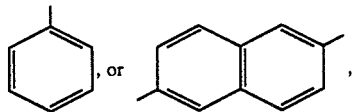

and the —R"— units are

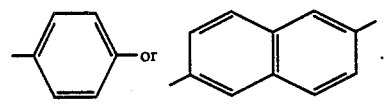

71. The polyester of claim 1 wherein from 70 to 100 per 100 glycol derived repeating units are

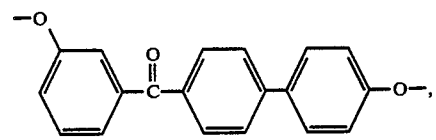

from 0 to 30 per 100 glycol derived repeating units are

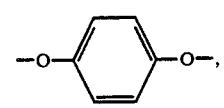

from 0 to 100 per 100 diacid derived repeating units are —R'— units of the structure

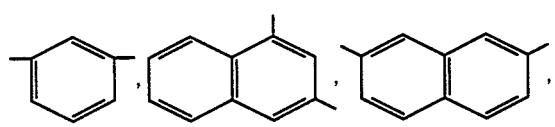

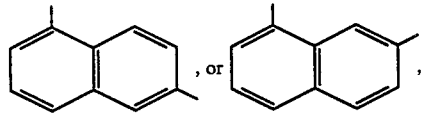

and 100 to 0 per 100 diacid derived repeating units are diacid derived repeating units of the structure

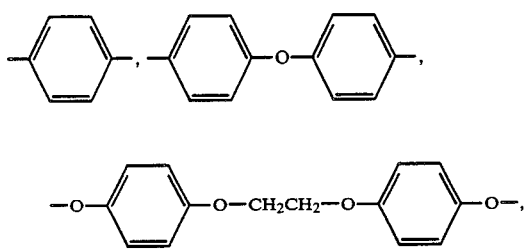

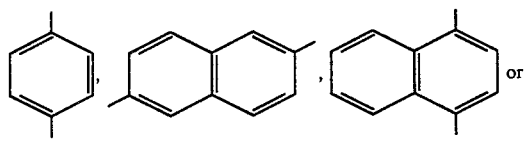

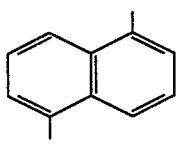

and from 100 to 300 per 100 diacid derived repeating units are hydroxy-acid derived —R"— units of the structure

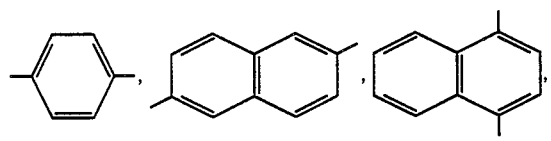

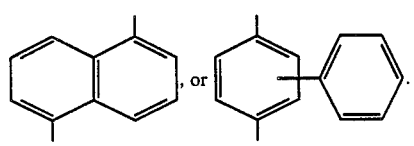

72. The polyester of claim 71 wherein from 30 to 100 per 100 diacid derived repeating units are —R'— units of the structure

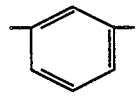

and from 100 to 250 per 100 glycol derived units are —R"— units.

73. The polyester of claim 72 wherein from 50 to 100 per 100 diacid derived repeating units are —R'— units of the structure

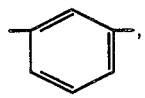

from 50 to 0 per 100 diacid derived repeating units are —R'— units of the structure

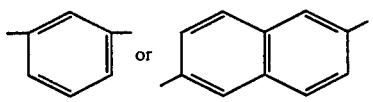

and 100 to 200 per 100 glycol derived units are hydroxy-acid derived —R"— units of the structure

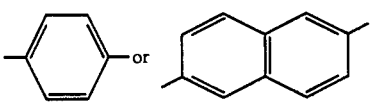

74. The polyester of claim 1 wherein from 30 to 100 per 100 glycol derived repeating units are

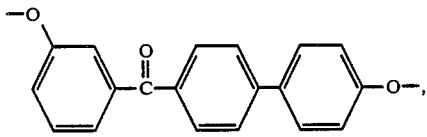

and from 0 to 70 per 100 glycol derived repeating units are units of the structure

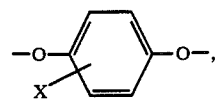

where —X is —F, —Cl or —Br, from 0 to 100 per 100 diacid derived repeating units are —R'— units of the structure

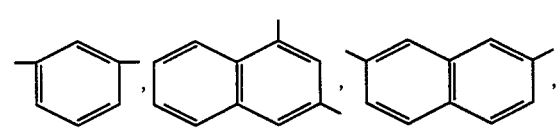

from 0 to 100 per 100 diacid derived repeating units are —R'— units of the structure

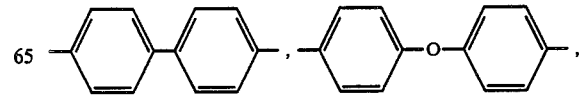

-continued

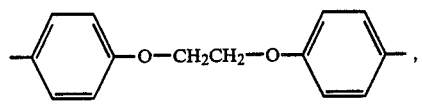

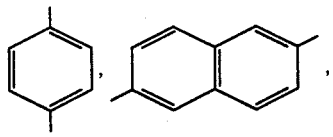

and from 100 to 300 per 100 glycol derived repeating units are hydroxy-acid derived —R"— units of the structure

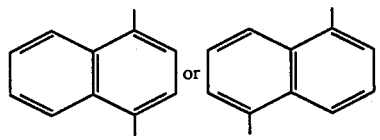

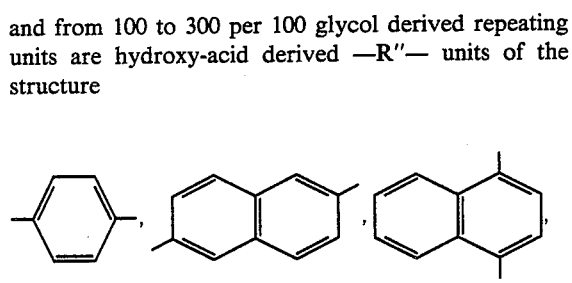

75. The polyester of claim 74 wherein from 30 to 100 per 100 diacid derived repeating units are —R'— units of the structure

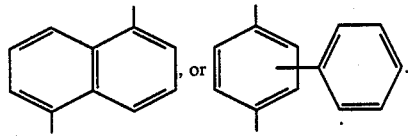

and from 100 to 250 per 100 glycol derived repeating units are hydroxy-acid derived —R"— units.

76. The polyester of claim 75 wherein from 50 to 100 per 100 diacid derived repeating units are —R'— units of the structure

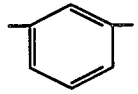

from 0 to 50 per 100 diacid derived repeating units are —R'— units of the structure

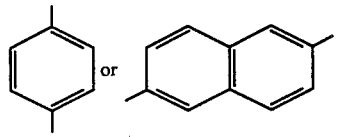

and from 100 to 200 per 100 glycol derived repeating units are hydroxy-acid derived —R"— units of the structure

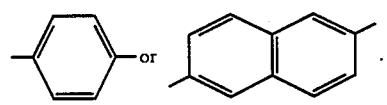

77. The polyester of claim 1 wherein from 30 to 100 per 100 glycol derived repeating units are

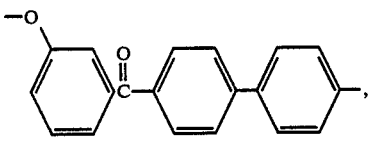

and 0 to 70 per 100 glycol derived repeating units are units of the structure

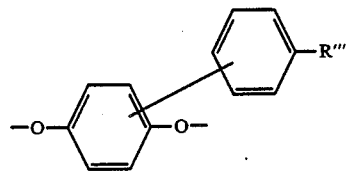

where —R'" is —H or —CH₃, —C₂H₅ or —Cl, from 0 to 100 per 100 diacid derived repeating units are —R'— units of the structure

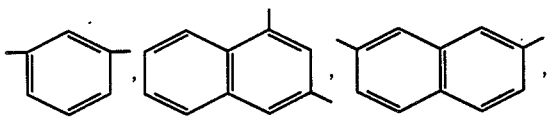

from 0 to 100 per 100 diacid derived repeating units are —R'— units of the structure

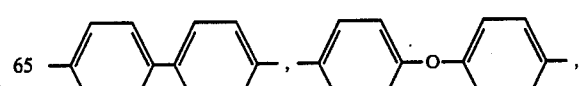

-continued

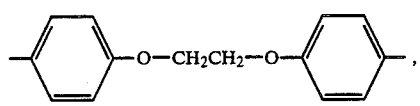

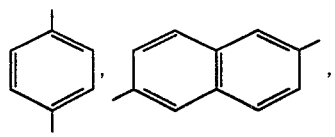

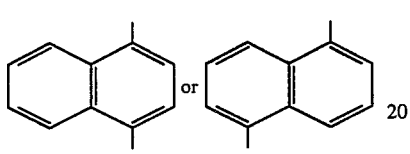

and from 100 to 300 per 100 glycol derived repeating units are —R'— units of the structure

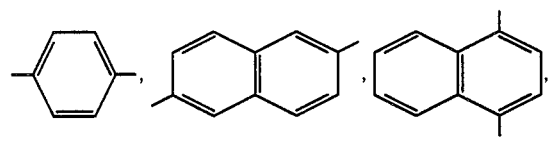

78. The polyester of claim 77 wherein from 30 to 100 per 100 diacid derived repeating units are —R'— units of the structure

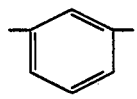

and from 100 to 250 per glycol derived repeating units are hydroxy-acid derived —R"— units.

79. The polyester of claim 78 wherein from 50 to 100 per 100 diacid derived repeating units are —R'— units of the structure

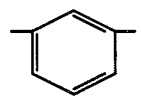

from 0 to 50 per 100 diacid derived repeating units are units of the structure

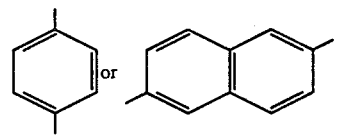

and from 100 to 200 per 100 glycol derived repeating units are hydroxy-acid derived —R"— units of the structure

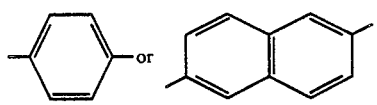

80. The polyester of claim 79 wherein —R'" is —H.
81. The polyester of claim 1 wherein from 80 to 100 per 100 glycol derived repeating units are units of the structure

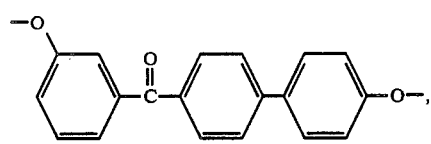

from 0 to 20 per 100 glycol derived repeating units are units of the structure

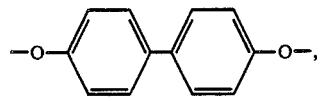

from 0 to 100 per 100 diacid derived repeating units are —R'— units of the structure

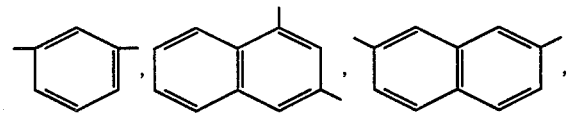

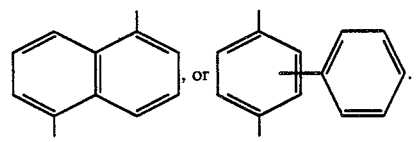

from 0 to 100 per 100 diacid derived repeating units are —R'— units of the structure

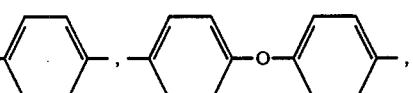

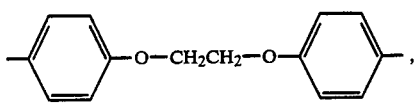

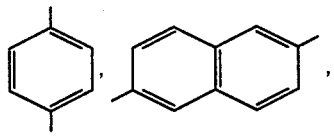

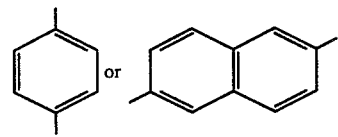 or 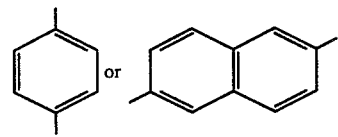

and from 100 to 200 per 100 glycol derived repeating units are hydroxy-acid derived —R″— units of the structure

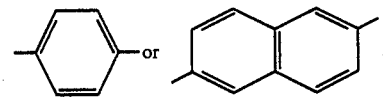

84. The polyester of claim 1 wherein from 30 to 100 per 100 glycol derived repeating units are units of the structure

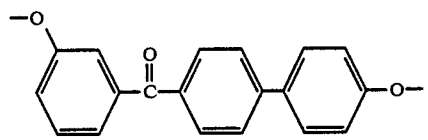

from 0 to 70 per 100 glycol derived repeating units are units of the structure

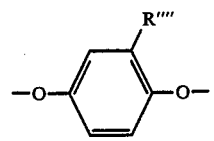

where —R″″ is —CH₃, —C₂H₅, —OCH₃ or —OC₂H₅, from 0 to 100 per 100 diacid derived repeating units are —R′— units of the structure

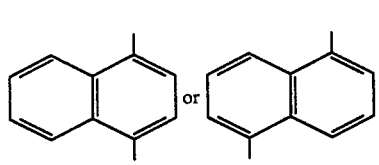

and from 100 to 300 per 100 glycol derived repeating units are hydroxy-acid derived —R″— units of the structure

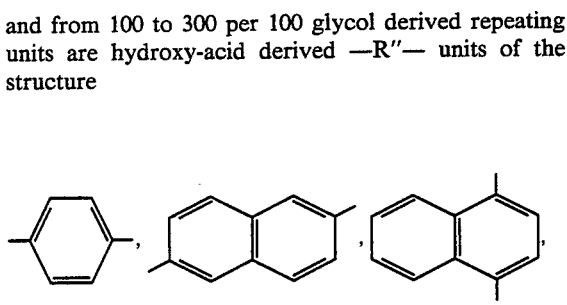

82. The polyester of claim 81 wherein from 30 to 100 per 100 diacid derived repeating units are —R′— units of the structure

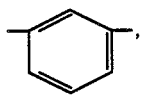

and from 100 to 250 per 100 glycol derived repeating units are hydroxy-acid derived —R″— units.

83. The polyester of claim 82 wherein from 50 to 100 per 100 diacid derived repeating units are —R′— units of the structure

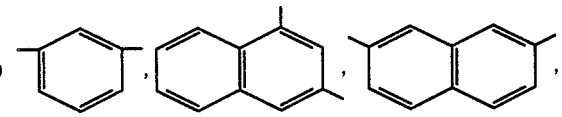

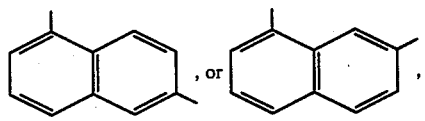

from 0 to 100 per 100 diacid derived repeating units are units of the structure

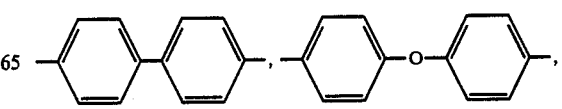

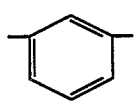

from 0 to 50 per 100 glycol derived repeating units are —R″— units of the structure -continued

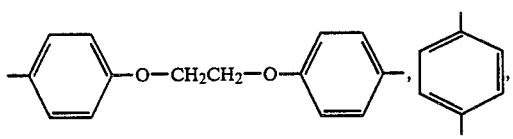, 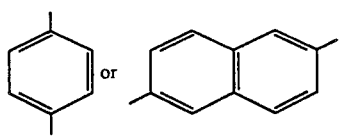

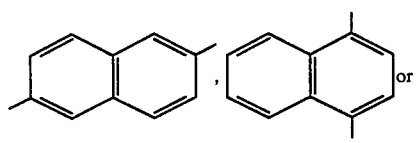

and from 100 to 200 per 100 glycol derived repeating units are hydroxy-acid derived —R"— units of the structure

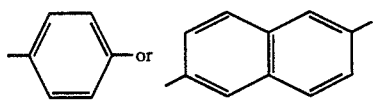

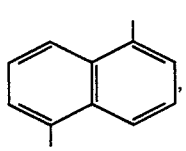

87. The polyester of claim 1 wherein from 70 to 100 per 100 glycol derived repeating units are units of the structure and from 100 to 300 per 100 glycol derived repeating units are hydroxy-acid derived —R"— units of the structure

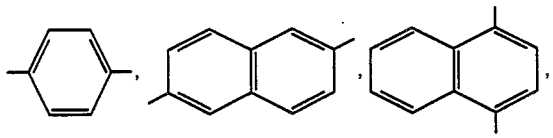

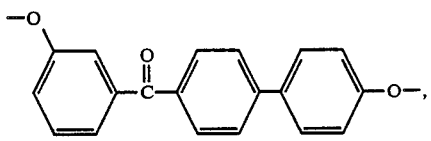

and 0 to 30 per 100 glycol derived repeating units of the structure

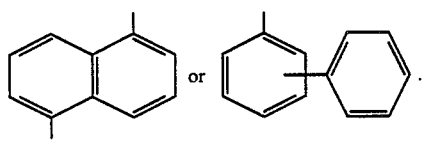

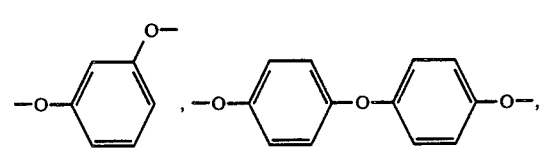

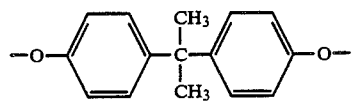

85. The polyester of claim 84 wherein from 30 to 100 per 100 diacid derived repeating units are —R'— units of the structure

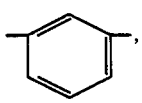

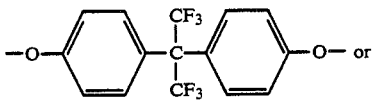

and from 100 to 250 per 100 glycol derived repeating units are hydroxy-acid derived —R"— units.

86. The polyester of claim 85 wherein from 50 to 100 per 100 diacid derived repeating units are —R'— units of the structure

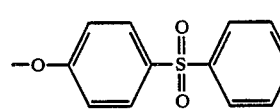

from 0 to 100 per 100 diacid derived repeating units are —R'— units of the structure

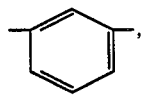

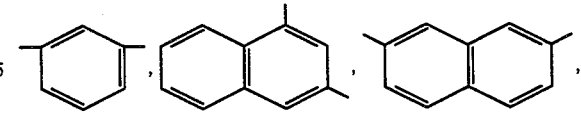

from 0 to 50 per 100 diacid derived repeating units are —R'— units of the structure

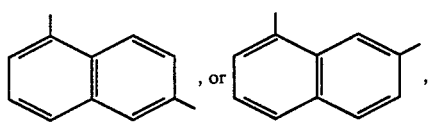

from 0 to 100 per 100 diacid derived repeating units are —R'— units of the structure

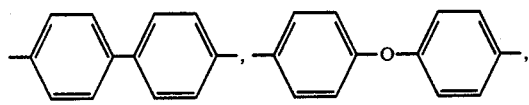

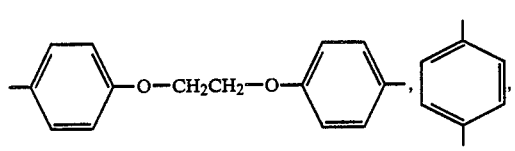

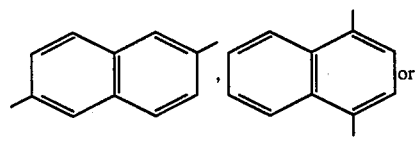

and from 100 to 300 per 100 glycol derived repeating units are hydroxy-acid derived —R"— units of the structure

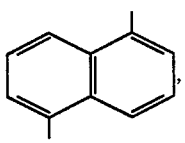

88. The polyester of claim 87 wherein from 30 to 100 per 100 diacid derived repeating units are units of the structure

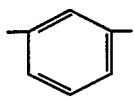

and from 100 to 250 per 100 glycol derived repeating units are hydroxy-acid derived —R"— units.

89. The polyester of claim 88 wherein from 50 to 100 per 100 diacid derived repeating units are units of the structure

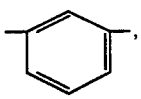

from 0 to 50 per 100 diacid derived repeating units are —R'— units of the structure

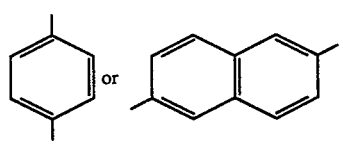

and from 100 to 200 per 100 glycol derived repeating units are hydroxy-acid —R"— units of the structure

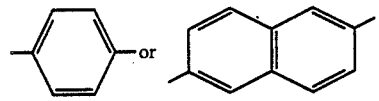

90. The polyester of claim 1 wherein from 80 to 100 per 100 glycol derived repeating units are units of the structure

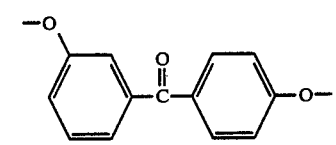

and from 0 to 20 per 100 glycol derived repeating units are units of the structure

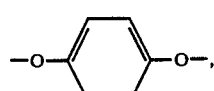

from 0 to 65 per 100 diacid derived repeating units are —R'— units of the structure

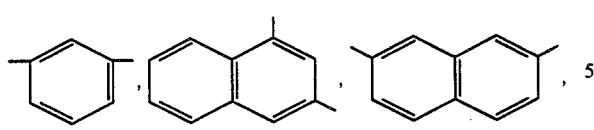

from 35 to 100 per 100 diacid derived repeating units are —R'— units of the structure

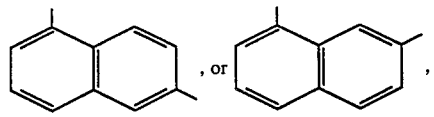

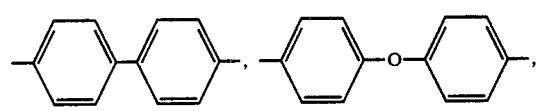

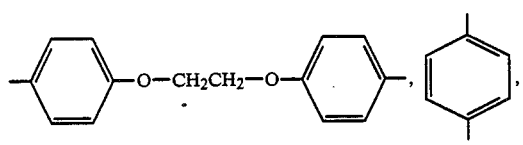

and from 100 to 300 per 100 glycol derived repeating units are hydroxy-acid derived —R"— units of the structure

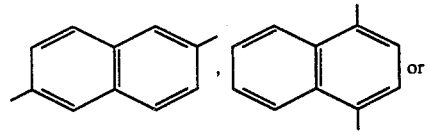

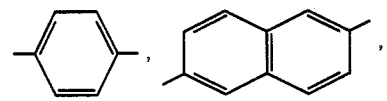

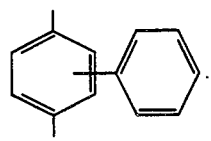

91. The polyester of claim 90 wherein from 30 to 65 per 100 diacid derived repeating units are —R'— units of the structure

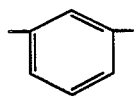

and from 100 to 250 per 100 glycol derived repeating units are hydroxy-acid derived —R"— units.

92. The polyester of claim 91 wherein from 50 to 65 per 100 diacid derived repeating units are —R'— units of the structure

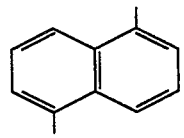

from 35 to 50 per 100 diacid derived repeating units are —R'— units of the structure

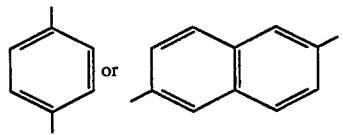

and from 100 to 200 per 100 glycol derived repeating units are hydroxy-acid derived —R"— units of the structure

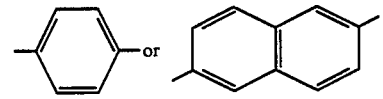

93. The polyester of claim 1 wherein from 55 to 100 per 100 glycol derived repeating units are units of the structure

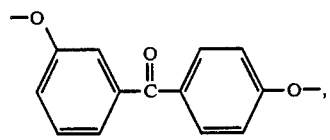

and from 0 to 45 per 100 glycol derived repeating units are units of the structure

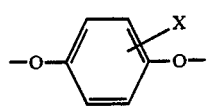

where —X is —H —F, —Cl, or —Br, from 0 to 65 per 100 diacid derived repeating units are —R'— units of the structure

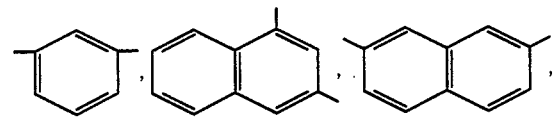

from 35 to 100 per 100 diacid derived repeating unit are —R'— units of the structure

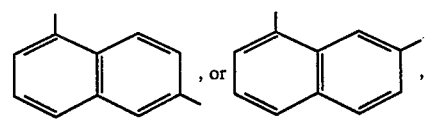

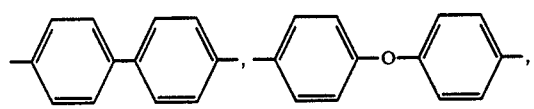

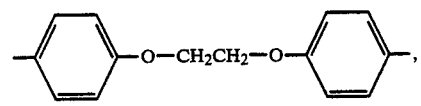

and from 100 to 300 per 100 glycol derived repeating units are hydroxy-acid derived —R"— units of the structure

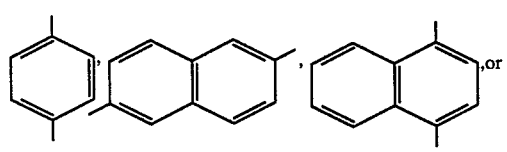

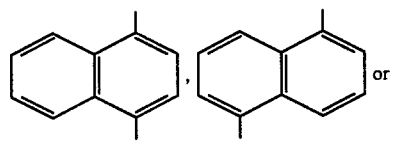

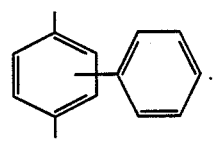

94. The polyester of claim 93 wherein from 30 to 65 per 100 diacid derived repeating units are —R'— units of the structure

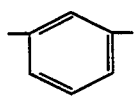

and from 100 to 250 per 100 glycol derived repeating units are hydroxy-acid derived —R' units.

95. The polyester of claim 94 wherein from 50 to 65 per 100 diacid derived repeating units are —R'— units of the structure

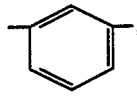

from 35 to 50 per 100 diacid derived repeating units are —R'— units of the structure

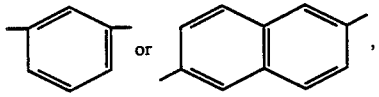

and from 100 to 200 per 100 glycol derived repeating units are hydroxy-acid derived —R"— units of the structure

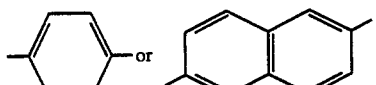

96. The polyester of claim 1 wherein from 55 to 100 per 100 glycol derived repeating units are units of the structure

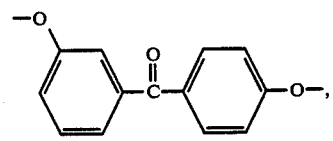

and from 0 to 45 per 100 glycol derived repeating units are units of the structure

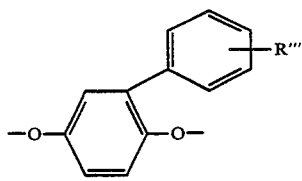

where —R''' is —H —CH₃, —C₂H₅ or —Cl from 0 to 65 per 100 diacid derived repeating units are —R'— units of the structure

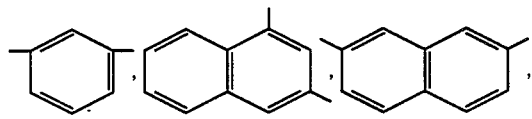

from 35 to 100 per 100 diacid derived repeating units are —R'— units of the structure

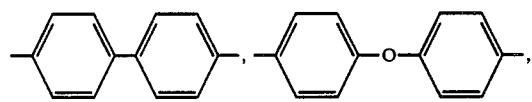

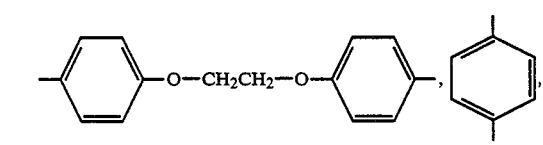

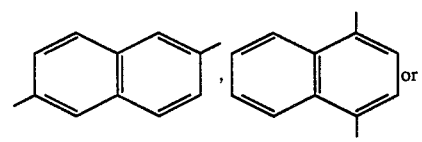

and from 100 to 300 per 100 glycol derived repeating units are hydroxy-acid derived —R''— units of the structure

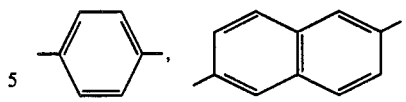

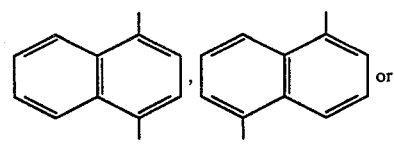

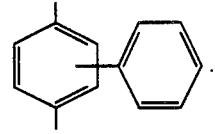

97. The polyester of claim 96 wherein from 30 to 65 per 100 diacid derived repeating units are —R'— units of the structure

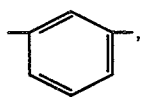

and from 100 to 250 per 100 glycol derived repeating units are hydroxy-acid derived —R''— units.

98. The polyester of claim 97 wherein from 50 to 65 per 100 diacid derived repeating units are —R'— units of the structure

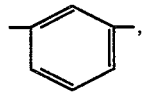

from 35 to 50 per 100 diacid derived repeating units are —R'— units of the structure

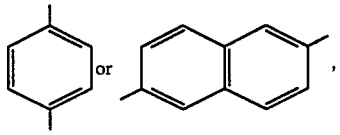

and from 100 to 200 per 100 glycol derived repeating units are hydroxy-acid derived —R''— units of the structure

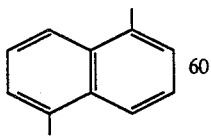

99. The polyester of claim 98 wherein —R''' is —H.
100. The polyester of claim 1 wherein from 85 to 100 per 100 glycol derived repeating units are units of the structure

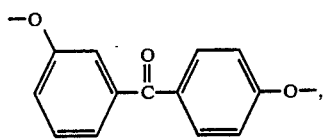

and from 0 to 15 per 100 glycol derived repeating units are units of the structure

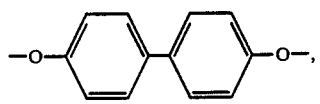

from 0 to 65 per 100 diacid derived repeating units are —R'— units of the structure

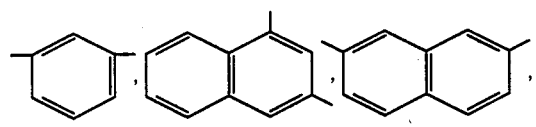

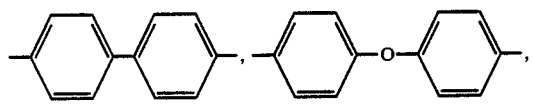

from 35 to 100 per 100 diacid derived repeating units are —R'— units of the structure

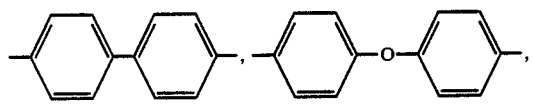

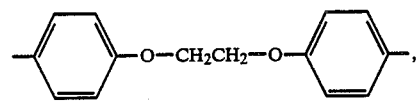

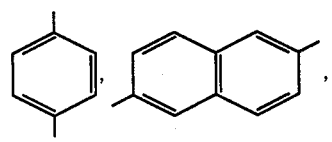

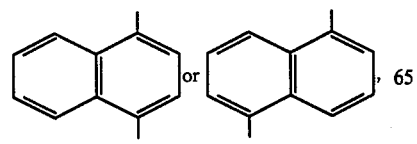

and from 100 to 300 per 100 glycol derived repeating units are hydroxy-acid derived —R"— units of the structure

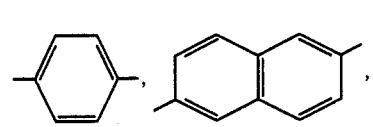

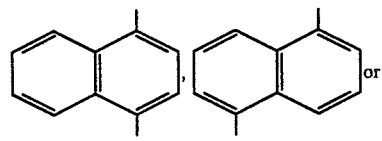

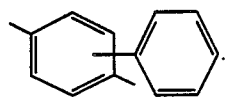

101. The polyester of claim 100 wherein from 30 to 65 per 100 diacid derived repeating units are —R'— units of the structure

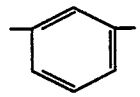

and from 100 to 250 per 100 glycol derived repeating units are hydroxy-acid derived —R"— units.

102. The polyester of claim 101 wherein from 50 to 65 per 100 diacid derived repeating units are —R'— units of the structure

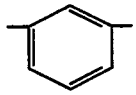

from 35 to 50 per 100 diacid derived repeating units are —R'— units of the structure

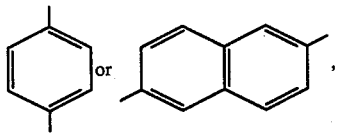

and from 100 to 200 per 100 glycol derived repeating units are hydroxy-acid derived —R"— units of the structure

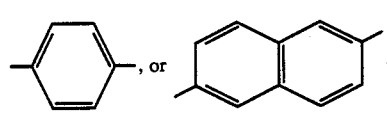

103. The polyester of claim 1 wherein from 55 to 100 per 100 glycol derived repeating units are units of the structure

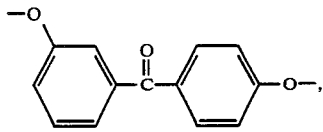

from 0 to 45 per 100 glycol derived repeating units are units of the structure

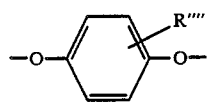

where —R'''' is —CH₃ or —C₂H₅, —O—CH₃, or —O—C₂H₅, from 0 to 65 per 100 diacid derived repeating units are —R'— units of the structure

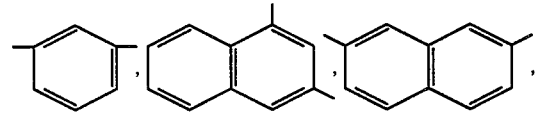

from 35 to 100 per 100 diacid derived repeating units are —R'— units of the structure

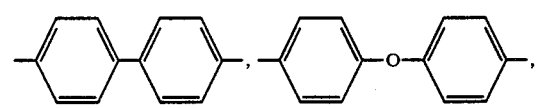

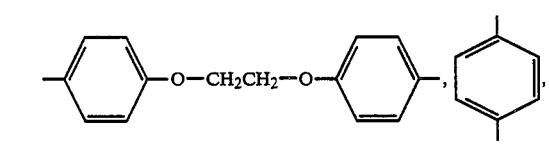

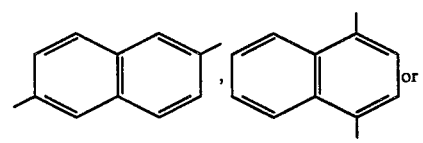

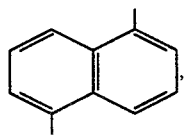

and from 100 to 300 per 100 glycol derived repeating units are hydroxy-acid derived —R"— units of the structure

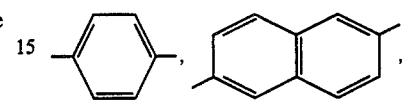

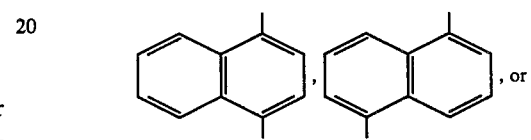

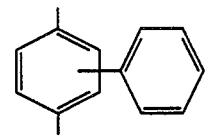

104. The polyester of claim 103 wherein from 30 to 65 per 100 diacid derived repeating units are —R'— units of the structure

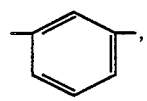

and from 100 to 250 per 100 glycol derived repeating units are hydroxy-acid derived —R"— units.

105. The polyester of claim 104 wherein from 50 to 65 per 100 diacid derived repeating units are —R' units of the structure

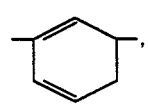

from 35 to 50 per 100 diacid derived repeating units are —R'— units of the structure

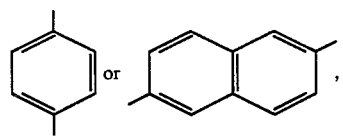

and from 100 to 200 per 100 glycol derived repeating units are hydroxy-acid derived —R"— units of the structure

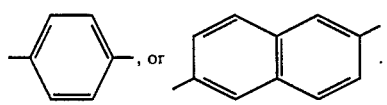

106. The polyester of claim 1 wherein from 80 to 100 per 100 glycol derived repeating units of the structure

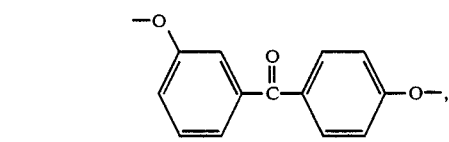

from 0 to 20 per 100 glycol derived repeating units are units of the structure

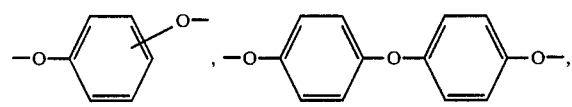

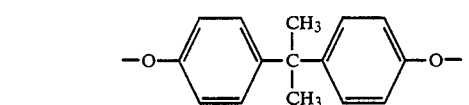

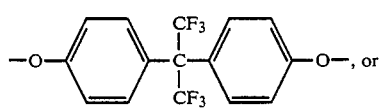

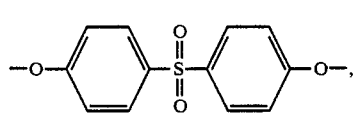

from 0 to 65 per 100 diacid derived repeating units are —R'— units of the structure

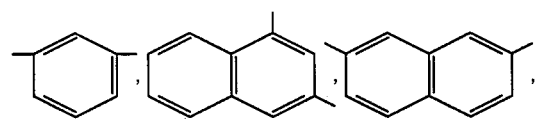

from 35 to 100 diacid derived repeating units are —R'— units of the structure

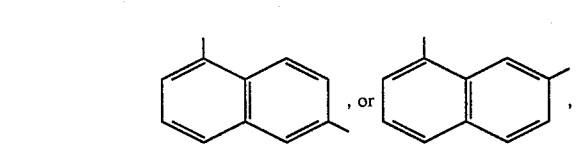

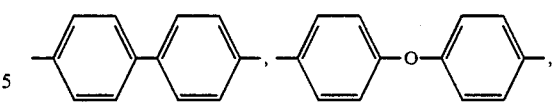

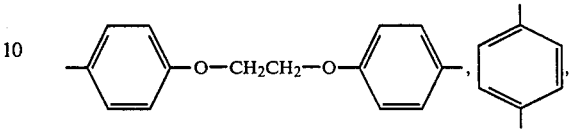

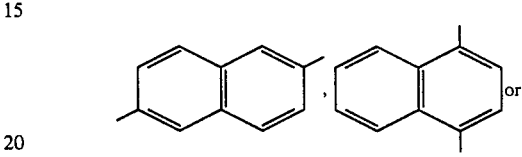

and from 100 to 300 per 100 glycol derived repeating units are hydroxy-acid derived —R"— units of the structure

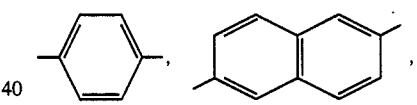

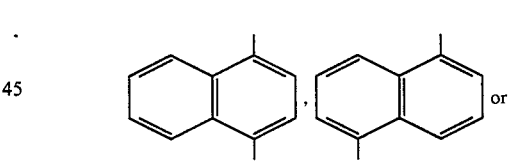

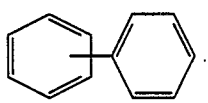

107. The polyester of claim 106 wherein from 30 to 65 per 100 diacid derived repeating units are —R'— units of the structure

and from 100 to 250 per 100 glycol derived repeating units are hydroxy-acid derived —R"— units.

108. The polyester of claim 107 wherein, from 50 to 65 per 100 diacid derived repeating units are —R'— units of the structure
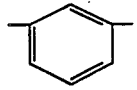
from 35 to 50 per 100 diacid derived repeating units are —R'— units of the structure
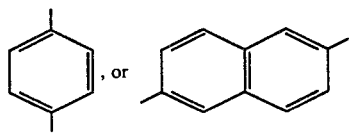
and from 100 to 200 per 100 glycol derived repeating units are hydroxy-acid derived —R"— units of the structure
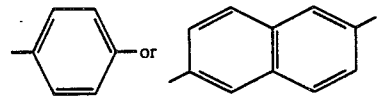
* * * * *